United States Patent

Momiyama et al.

(10) Patent No.: US 12,000,699 B2
(45) Date of Patent: Jun. 4, 2024

(54) OPTICAL INTERFERENCE MEASURING APPARATUS AND OPTICAL INTERFERENCE MEASURING METHOD

(71) Applicants: TOPCON CORPORATION, Tokyo (JP); RIKEN, Saitama (JP)

(72) Inventors: Homare Momiyama, Tokyo (JP); Yoshiaki Sasaki, Miyagi (JP); Isao Yoshimine, Miyagi (JP); Chiko Otani, Miyagi (JP); Tetsuya Yuasa, Yamagata (JP)

(73) Assignees: TOPCON CORPORATION, Tokyo (JP); RIKEN, Saitama (JP)

( * ) Notice: Subject to any disclaimer, the term of this patent is extended or adjusted under 35 U.S.C. 154(b) by 291 days.

(21) Appl. No.: 17/614,880

(22) PCT Filed: May 25, 2020

(86) PCT No.: PCT/JP2020/020582
§ 371 (c)(1),
(2) Date: Nov. 29, 2021

(87) PCT Pub. No.: WO2020/241583
PCT Pub. Date: Dec. 3, 2020

(65) Prior Publication Data
US 2022/0228850 A1  Jul. 21, 2022

(30) Foreign Application Priority Data
May 30, 2019  (JP) ................................. 2019-100827

(51) Int. Cl.
*G01B 9/02* (2022.01)
*G01B 9/02004* (2022.01)
(Continued)

(52) U.S. Cl.
CPC ..... *G01B 9/02084* (2013.01); *G01B 9/02004* (2013.01); *G01B 9/02091* (2013.01);
(Continued)

(58) Field of Classification Search
CPC ............ G01B 9/02084; G01B 9/02004; G01B 9/02091; G01N 21/01; G01N 21/45; G01N 21/4795
See application file for complete search history.

(56) References Cited

U.S. PATENT DOCUMENTS

2009/0024360 A1   1/2009  Arnvidarson
2009/0263040 A1  10/2009  Rolland et al.
(Continued)

FOREIGN PATENT DOCUMENTS

| | | |
|---|---|---|
| JP | 2008-175698 A | 7/2008 |
| WO | 2015001918 A1 | 1/2015 |
| WO | 2020241584 A1 | 12/2020 |

OTHER PUBLICATIONS

Seelamantula, Chandra Sekhar, and Satish Mulleti. "Super-resolution reconstruction in frequency-domain optical-coherence tomography using the finite-rate-of-innovation principle." IEEE Transactions on Signal Processing 62.19 (2014): 5020-5029. (Year: 2014).*

(Continued)

*Primary Examiner* — Dominic J Bologna
(74) *Attorney, Agent, or Firm* — Studebaker & Brackett PC

(57) ABSTRACT

Provided is an optical interference measuring apparatus including a measuring unit for acquiring an interferogram of an interference wave obtained by irradiating a measuring target and a reference surface with electromagnetic waves and causing reflected waves from a reflecting surface of the measurement target and reflected waves from the reference (Continued)

surface to interfere and a signal processing unit for configuring an intensity profile in the depth direction by performing Fourier transform of the interferogram. The signal processing unit is configured to estimate a parameter for a model formula for an assumed surface count, based on the model formula of an interferogram when it is assumed that the measurement target has a predetermined structure, to select an optimal model by a statistical technique from the model formula to which a parameter estimated for the assumed surface count is applied, and to reconfigure an intensity profile based on the optimal model.

5 Claims, 19 Drawing Sheets

(51) Int. Cl.
  *G01B 9/02091* (2022.01)
  *G01N 21/01* (2006.01)
  *G01N 21/45* (2006.01)
  *G01N 21/47* (2006.01)

(52) U.S. Cl.
  CPC ............. *G01N 21/01* (2013.01); *G01N 21/45* (2013.01); *G01N 21/4795* (2013.01)

(56) References Cited

U.S. PATENT DOCUMENTS

| | | | |
|---|---|---|---|
| 2014/0023255 A1 | 1/2014 | Lim et al. | |
| 2014/0177790 A1 | 6/2014 | Bone et al. | |
| 2016/0097716 A1* | 4/2016 | Gulati | A61B 5/1495 250/340 |
| 2022/0221266 A1* | 7/2022 | Momiyama | G01B 9/02091 |

OTHER PUBLICATIONS

International Search Report issued in the corresponding Application No. PCT/JP2020/020582 mailed Aug. 25, 2020.
International Search Report issued in the related Application No. PCT/JP2020/020582 mailed Aug. 25, 2020.
Seelamantula, C. s., et al., "Super-Resolution Reconstruction in Frequency-Domain Optical-Coherence Tomography Using the Finite-Rate-of-Innovation Principle", IEEE Transactions on Signal Processing, Oct. 1, 2014, vol. 62, No. 19, pp. 5020-5029.
Chen, H., et al., "Speckle reduction based on fractional-order filtering and boosted singular value shrinkage for optical coherence tomography image", Biomedical Signal Processing and Control, May 9, 2019, vol. 52, pp. 281-292.
Y. Xie et al, "Reduction of periodic noise in Fourier domain optical coherence tomography images by frequency domain filtering", Biomedical Engineering / Biomedizinische Technik, (Jan. 6, 2012), vol. 57, No. SI-1 Track-P, doi:10.1515/bmt-2012-4189, ISSN 0013-5585, XP055201283 [X] 1,6 * the whole document * [Y] 2.
Dierck Hillmann et al, "Off-axis reference beam for full-field swept-source OCT and holoscopy", arxiv.org, Cornell University Library, 201 Olin Library Cornell University Ithaca, NY 14853, (Mar. 13, 2017), doi:10.1364/OE.25.027770, XP081274628 [X] 1,6 * the whole document * [Y] 2.
Seelamantula Chandra Sekhar et al, "Super-Resolution Reconstruction in Frequency-Domain Optical-Coherence Tomography Using the Finite-Rate-of-Innovation Principle", IEEE Transactions on Signal Processing, IEEE, USA, vol. 62, No. 19, doi:10.1109/TSP.2014.2340811, ISSN 1053-587X, (Oct. 1, 2014), pp. 5020-5029, (Aug. 27, 2014), XP011557578 [X] 3-5,7 * the whole document * [Y] 2.
Momiyama Homare et al, "Improvement of the depth resolution of swept-source THz-OCT for non-destructive inspection", Optics Express, vol. 28, No. 8, doi:10.1364/OE.386680, (Apr. 13, 2020), p. 12279, URL: https://opg.optica.org/DirectPDFAccess/5722BE6A-AFBD-4DF5-90E4C634D6756DE0_429902/oe-28-8-12279.pdf?da=1&id=429902&seq=0&mobile=no, XP055920360 [T] 1-7 * the whole document *.

* cited by examiner (A)

(B)

Depth (optical distance)

(A)

⇓ FFT (B)

⇓ Filtering (C)

⇓ IFFT (D)

OPTICAL INTERFERENCE MEASURING APPARATUS AND OPTICAL INTERFERENCE MEASURING METHOD

The present application is a U.S. National Phase of PCT/JP2020/020582 filed on May 25, 2020 claiming priority to Japanese Patent Application No. 2019-100827 filed on May 30, 2019. The disclosure of the PCT Application is hereby incorporated by reference into the present Application.

TECHNICAL FIELD

The present invention relates to an optical interference measuring apparatus and an optical interference measuring method and, more particularly, to a Fourier domain optical interference measuring apparatus and a Fourier domain optical interference measuring method.

BACKGROUND ART

Conventionally, optical coherence tomography (OCT) has been known as a technique of imaging the internal structure of a measurement target at high resolution non-contact, non-invasive manner.

In Fourier domain OCT (FD-OCT) measurement, first, an interference light intensity is measured for each spectrum of light, and an intensity distribution called an interferogram is obtained by subtracting direct current components from the interference light intensities. The intensity spectrum of reflected light in the depth direction is acquired by fast Fourier transform (FFT) of the interferogram. Patent Literature 1 discloses a swept source-OCT (SS-OCT) as an apparatus for performing FD-OCT measurement.

CITATION LIST

Patent Literature

Patent Literature 1: WO 2015/001918

SUMMARY OF INVENTION

Technical Problem

The resolution of an intensity spectrum in the depth direction of a three-dimensional measurement system using FD-OCT is limited by the frequency bandwidth of a light source. This is because fast Fourier transform is used when reconfiguring an interferogram into an intensity profile in the depth direction.

More specifically, in principle, if a measurement target is a layered structure with discrete intervals and the frequency bandwidth of a light source is infinite, an intensity profile as its Fourier transform should be obtained by a sequence of delta functions. In practice, however, the frequency bandwidth is a window function, and hence the convolution integral between its Fourier transform and the Fourier transform of an interferogram is obtained as an intensity profile.

Accordingly, in order to improve the depth resolution of an intensity profile, it is necessary to widen the frequency band of a light source. However, widening the frequency of the light source will cause problems such as increasing the size of the apparatus and increasing the cost.

The present invention has been made in consideration of the above circumstances and has as its object to improve the resolution of an intensity profile in the depth direction in an optical interference measuring technique without using any broadband light source.

Solution to Problem

In order to achieve the above object, an optical interference measuring apparatus according to the first aspect of the present invention includes a measuring unit configured to acquire an interferogram of an interference wave by irradiating a measurement target and a reference surface with electromagnetic waves and causing a reflected wave from a reflecting surface of the measurement target to interfere with a reflected wave from the reference surface and a signal processing unit configured to configure an intensity profile in a depth direction by performing Fourier transform of the interferogram, the signal processing unit including a model parameter estimation unit configured to estimate, based on a model formula of an interferogram when it is assumed that a measurement target is a layered structure having at least one reflecting surface, a parameter for the model formula for each assumed surface count in a predetermined assumed surface count range, an optimal model selection unit configured to select an optimal model formula by a statistical technique from the model formula to which a parameter estimated for each of the assumed surface count is applied, and an intensity profile reconfiguration unit configured to reconfigure an intensity profile in the depth direction based on the optimal model formula.

In the above aspect, the model parameter estimation unit preferably estimates, based on a model formula of an interferogram when it is assumed that a measurement target is a layered structure having at least one reflecting surface count, with a refractive index in each layer being constant, a parameter for the model formula.

In the above aspect, the optimal model selection unit preferably reconfigures an interferogram by using the model formula to which a parameter estimated for each of the assumed surface count is applied, calculates a likelihood between the reconfigured interferogram and an original interferogram, and selects an optimal model formula based on an information amount criterion obtained by setting the assumed reflecting surface count as the degree of freedom.

In the above aspect, the assumed surface count range is preferably determined based on a structure characteristic of a measurement target.

In the above aspect, the assumed surface count range is preferably determined based on a peak count of an intensity profile in the depth direction which is configured by the original interferogram.

An optical interference measuring method according to the second aspect of the present invention includes a step of configuring an intensity profile in a depth direction by irradiating a measurement target and a reference surface with electromagnetic waves and performing Fourier transform of an interferogram of an interference wave obtained by causing a reflected wave from a reflecting surface of the measurement target to interfere with a reflected wave from the reference surface, a step of estimating, based on a model formula of an interferogram when it is assumed that a measurement target is a layered structure having at least one reflecting surface count, a parameter for the model formula for each assumed surface count in a predetermined assumed surface count range, a step of selecting an optimal model formula by a statistical technique from the model formula to which a parameter estimated for each of the assumed surface count is applied, and a step of reconfiguring an intensity profile based on the optimal model formula.

Advantageous Effects of Invention

An optical interference measuring apparatus and an optical interference measuring method according to the above configurations can improve the resolution of an intensity profile in the depth direction without using any broadband light source.

DESCRIPTION OF EMBODIMENTS

Figure 1:
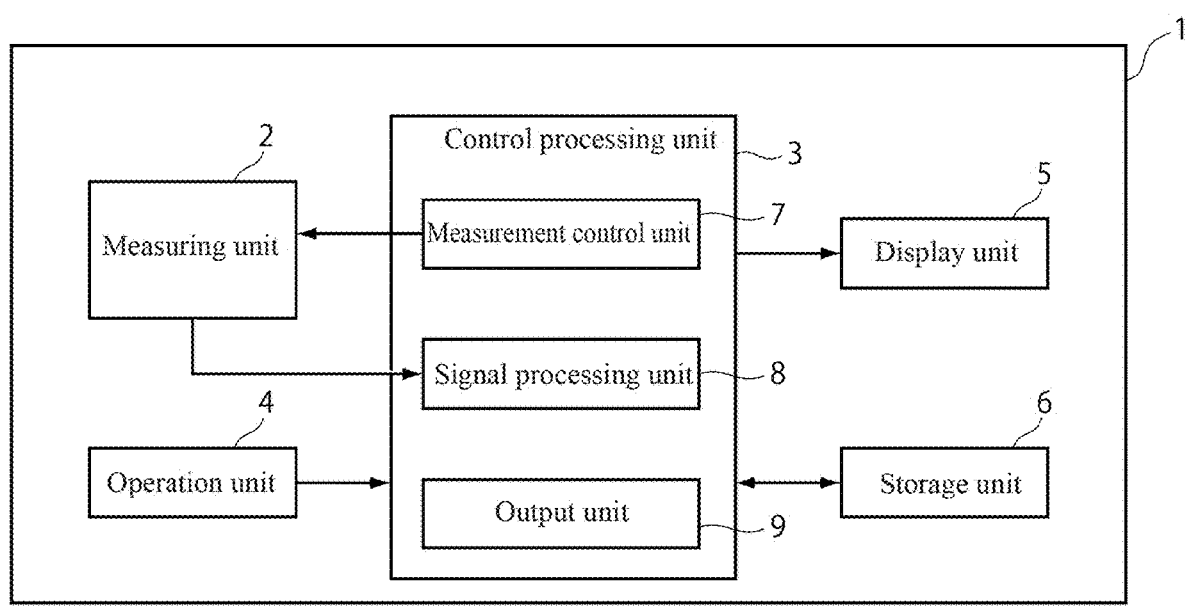
FIG. 1 is a block diagram illustrating the schematic configuration of an optical interference measuring apparatus according to an embodiment of the present invention.

The preferred embodiments of the present invention will be described below with reference to the accompanying drawings, however, the present invention is not limited to these embodiments. In the description of the following embodiments, the same reference numerals denote the same constituent elements, the same terms mean similar constituent elements, and redundant descriptions will be omitted as appropriate.

EMBODIMENT

1. Overall Configuration of Optical Interference Measuring Apparatus

FIG. 1 is a block diagram illustrating the schematic configuration of an optical interference measuring apparatus 1 according to an embodiment of the present invention. The optical interference measuring apparatus 1 is an SS-OCT, and this apparatus is used for, for example, the inspection of the internal structure of a concrete structure.

As illustrated in FIG. 1, the optical interference measuring apparatus 1 includes a measuring unit 2, a control processing unit 3, an operation unit 4, a display unit 5, and a storage unit 6.

Figure 2:
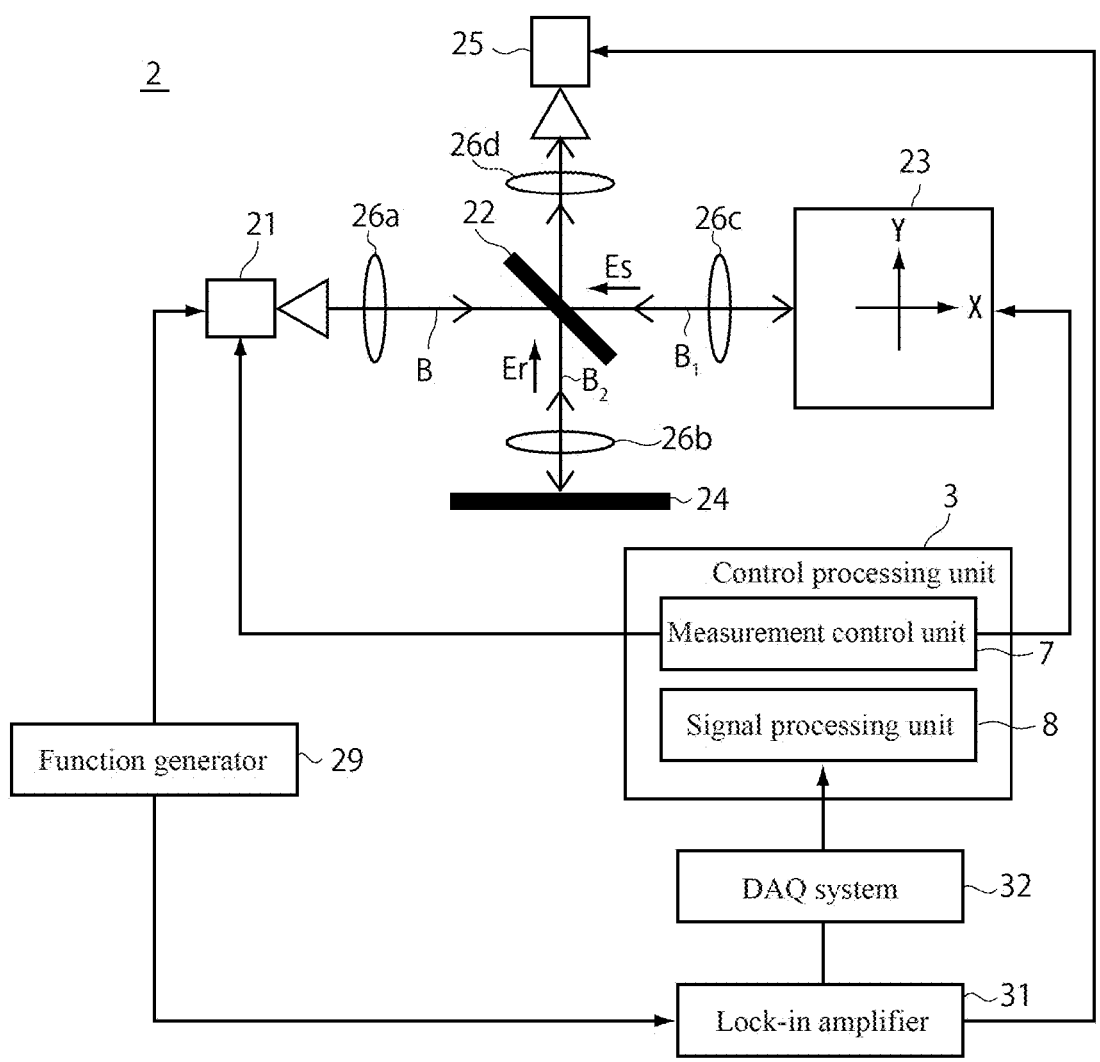
FIG. 2 is a schematic configuration view of the measuring unit of the optical interference measuring apparatus.

FIG. 2 illustrates the schematic configuration of the measuring unit 2.

The measuring unit 2 mainly includes a light source 21, a beam splitter 22, an automatic stage 23 for the installation of a measurement target, a reference surface 24, and a detector 25.

The light source 21 is a variable frequency swept light source. This light source emits an electromagnetic beam while sweeping a wavelength at regular intervals within a predetermined wavelength band. It is possible to use, as the light source 21, an oscillation source such as an oscillation source using a Gunn diode or Shottkey barrier diode (SBD) which is a semiconductor material, and an oscillation source, based on frequency conversion using nonlinear crystal using a wavelength variable semiconductor laser (LD) as seed light. Alternatively, an oscillation source such as a TUNNET diode, resonance tunnel diode (RTD), or monolithic microwave IC (MMIC) may be used as the light source 21.

The beam splitter 22 is, for example, a beam splitter having a branching ratio of 50:50. The beam splitter 22 splits a light beam B from the light source 21 into measurement light $B_1$ and reference light $B_2$.

The automatic stage 23 holds a measurement target and sets a measurement surface. The measurement surface is a surface of a measurement target. The automatic stage 23 is configured such that the surface of the measurement target can move in the directions of two axes, that is, the X-axis and Y-axis, when a plane orthogonal to the optical axis of the measurement light $B_1$ is assumed to be an XY plane. The automatic stage 23 is driven and controlled by a measurement control unit (to be described later).

The reference surface 24 is a mirror and reflects the reference light $B_2$.

The detector 25 is, for example, a Schottky barrier diode provided with a waveguide and an antenna and detects an interference signal between the reflected light of the reference light $B_2$ (to be described later) and the reflected light of the measurement light $B_1$ (to be described later).

The light source 21 changes the frequency of the oscillator under the control of a measurement control unit 7. A lock-in amplifier 31 for detecting weak currents is connected to the detector 25. A function generator 29 applies On-Off modulation to the light source 21 to provide a reference signal to the lock-in amplifier 31 on the detector 25 side.

Light emitted from the light source 21 enters the beam splitter 22 through a collimate lens 26a and is split into the measurement light $B_1$ and the reference light $B_2$. The reference light $B_2$ propagates to the reference surface 24 while being collimated by a collimate lens 26b and is reflected by the reference surface 24. This light then propagates to the detector 25 through the beam splitter 22. Meanwhile, the measurement light $B_1$ is shaped in terms of its beam shape by a collimate lens 26c and propagates to the measurement target. The light reflected by the reflecting surface of the measurement target then enters the beam splitter 22 again and propagates to the detector 25 through a collimate lens 26d.

Note that in this description, the "reflecting surface" of a measurement target includes the surface and the internal reflecting surface of the measurement target. Accordingly, the first reflecting surface means the surface of the measurement target.

According to the principle of SS-OCT, when the frequency of the light source 21 is swept, an interference pattern (interferogram) corresponding to the difference between the optical path length of the measurement light $B_1$ from the measurement target and the optical path length of the reference light $B_2$ is generated. The detector 25 detects the interference pattern. A DAQ system (data acquisition system) 32 samples and digitizes the detection signal and outputs the resultant signal as image data. This image data is the interferogram illustrated in FIG. 3.

Referring back to FIG. 2, the control processing unit 3 can refer to an arbitrary electrical circuit (or its part). The electrical circuit includes, for example, arbitrary numbers of electrical parts including resistors, transistors, capacitors, and inductors. This circuit may have an arbitrary form including, for example, an integrated circuit, an aggregate of integrated circuits, a microcontroller, a microprocessor, and an aggregate of electrical parts on a printed board (PCB). The control processing unit 3 may be incorporated in the housing of the optical interference measuring apparatus 1, a standalone device, or part of a discrete personal computer.

The control processing unit 3 includes, as functional units, the measurement control unit 7 that controls measurement by the measuring unit 2, a signal processing unit 8 that processes a signal acquired by the measuring unit 2, and an output unit 9. The functions of the respective functional units including functional units further described in detail below may be implemented by circuits or by executing a program. When these functions are to be implemented by a program, the program may be stored in a recording medium such as a magnetic disk, flexible disk, optical disk, compact disk, Blu-ray (trademark registration) disk, or DVD.

The measurement control unit 7 modulates the frequency of the light source 21. In addition, the measurement control unit 7 controls the driving of the automatic stage 23. The signal processing unit 8 performs processing for configuring an intensity profile from an interferogram. The signal processing unit 8 will be described in detail later. The output unit 9 displays the intensity profile generated by the signal processing unit 8 on the display unit 5 and stores the profile in the storage unit 6.

The operation unit 4 is a device for allowing a user to input instructions to the optical interference measuring apparatus 1 and includes, for example, a mouse, a touch pad, a keyboard, an operation panel, a joystick, buttons, and switches, etc.

The display unit 5 is, for example, a liquid crystal display and displays the intensity profile and other information generated by the signal processing unit 8.

2. Detailed Configuration of Signal Processing Unit

Figure 4:
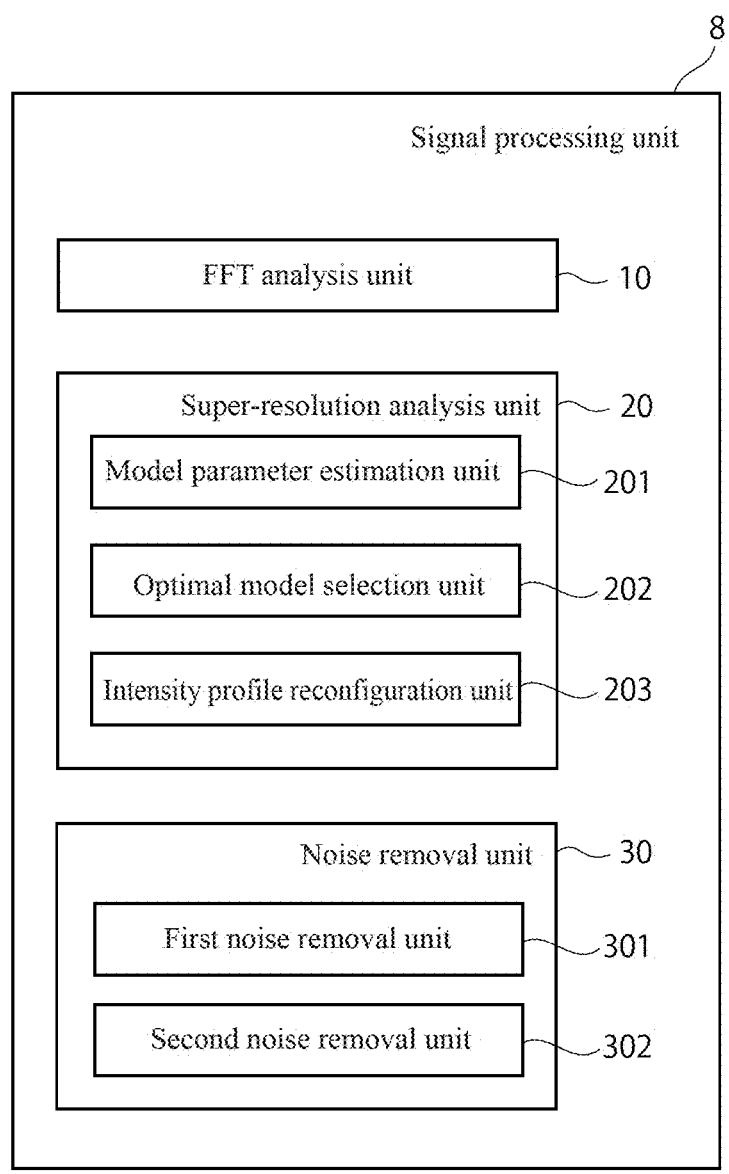
FIG. 4 is a functional configuration view of the signal processing unit of the optical interference measuring apparatus.

Next, the signal processing unit 8 will be described in detail with reference to FIG. 4. The signal processing unit 8 includes an FFT analysis unit 10, a super-resolution analysis unit 20, and a noise removal unit 30.

The FFT analysis unit 10 reconfigures an intensity profile in the depth direction (hereinafter simply referred to as an "intensity profile") by performing fast Fourier transform of an interferogram. This method is a known method, and hence an explanation of the method will be omitted.

The super-resolution analysis unit 20 includes a model parameter estimation unit 201, an optimal model selection unit 202, and an intensity profile reconfiguration unit 203.

The model parameter estimation unit 201 models the interferogram measured by the optical interference measuring apparatus 1 and estimates parameters for the model formula.

Figure 5:
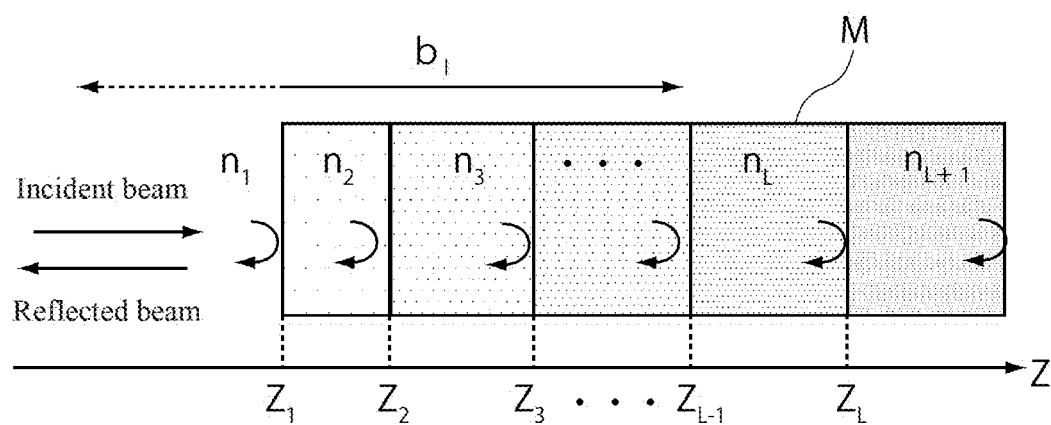
FIG. 5 is a view for explaining the structure of a layered structure.
Figure 5:
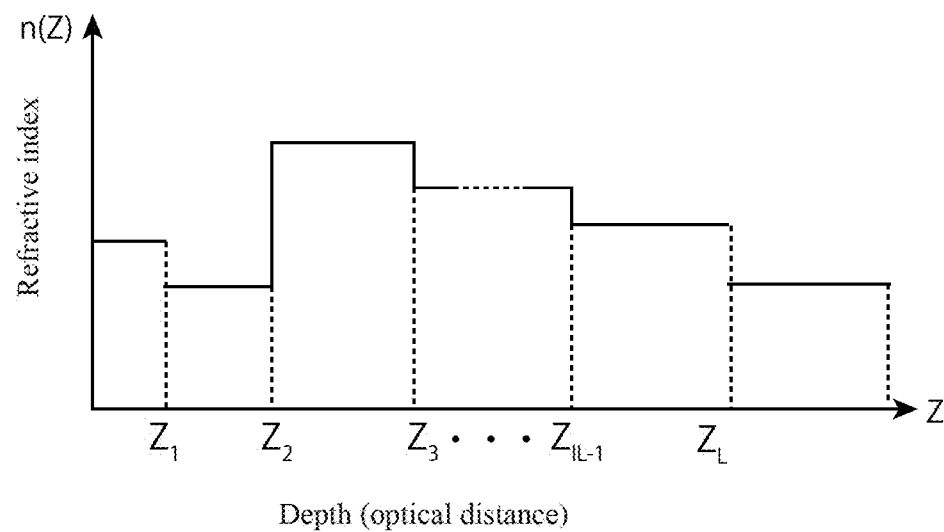

More specifically, as illustrated in FIG. 5, assume a virtual layered structure M without attenuation and dispersion which includes a reflecting surface count L of at least one, with a refraction index $n_l$ in each layer being constant.

Letting $E_r(\kappa)$ be an electric field from the reference surface side and $E_s(\kappa)$ be an electric field from the measurement target side, an interferogram $I(\kappa)$ obtained by measuring the layered structure M can be expressed as follows. Note that in this case, "reflecting surface" is an interface between air and the layered structure M or between adjacent layers and a surface that reflects or internally reflects measurement light, that is, the surface of the layered structure M is the first reflecting surface.

$$I(k) = |E_r(k) + E_s(k)|^2 \quad (1)$$

$$= |A_0(k)|^2 \left| 1 + \sum_{l=1}^{L} a_l e^{i2\pi k b_l} \right|^2$$

where $|A_O(k)|^2$ is the intensity of a light source, $$a_l = \frac{n_{l+1} - n_l}{n_{l+1} + n_l}$$

is the reflection coefficient (Fresnel reflection) between the layers, $b_l = [\Sigma_{p=1}^{l}(z_p - z_{p-1})n_p]$ is the optical path length difference (hereinafter referred to as an "optical distance") from the reference surface to each layer, z is the distance to each layer, l=1, 2, 3, . . . , L represents reflecting surface numbers up to L, p=1, 2, 3, . . . , 1 represents surface numbers up to 1.

When the interferogram l(k) is normalized with the intensity $|A_O(k)|^2$ of the light source and there is no multireflection in the sample, the following approximation can be established.

$$D_k = \frac{I(k)}{|A_0(k)|^2} - 1 \quad (2)$$

$$= \left| \sum_{l=1}^{L} a_l e^{i2\pi k b_l} \right|^2$$

$$= \sum_{l=1}^{L} (a_l e^{i2\pi b_l k} + a_l * e^{i2\pi b_l k}) + \sum_{l=1}^{L} \sum_{m=1}^{L} a_l \alpha_{m}* e^{-i2\pi(b_m - b_l)k}$$

$$D_K \sim \sum_{l=1}^{L} (a_l e^{i2\pi b_l k_{min}} e^{i2\pi b_l \Delta k K} + a_l^* e^{-i2\pi b_l k_{min}} e^{-i2\pi b_l \Delta k K})$$

where $k_{min}$ is the minimum wavenumber, $\Delta k$ is a wavenumber interval, and $k=0, 1, 2, 3, \ldots, K-1$ represents a wavenumber.

In addition, equation (2) can be simplified as a model formula as follows by setting $$A_l = a_l e^{i2\pi b_l k_{min}} \text{ and } \gamma_l = e^{i2\pi b_l \Delta k}.$$

$$D_\kappa = \sum_{l=1}^{L} (A_l \gamma_l^\kappa + A_l^* \gamma_l^{*\kappa}) \quad (3)$$

Accordingly, model formula (3) has three parameters, namely L, $A_l$, and $\gamma_l$.

The reflecting surface count L is assumed based on model formula (3), and the remaining parameters $A_l$ and $\gamma_l$ are estimated as follows. An assumed reflecting surface count will be hereinafter referred to as an "assumed surface count."

First, the z conversion of a filter $p_j$ is performed as follows.

$$P(x) = \prod_{l=1}^{L} (x^{-1} - \gamma_l^{-1})(x^{-1} - \gamma_l^{*-1}) = \sum_{j=0}^{2L} p_j x^{-j} \quad (4)$$

Then, the convolution integral between the normalized interferogram and the filter is as follows.

$$\sum_{j=0}^{2L} p_j D_{\kappa-j} = 0, \kappa = 2L, 2L+1, 2L+2, \ldots, K-1 \quad (5)$$

This equation can be rewritten into a matrix as follows.

$$\begin{pmatrix} D_{2L} & D_{2L-1} & D_{2L-2} & & D_2 & D_1 & D_0 \\ D_{2L+1} & D_{2L} & D_{2L-1} & \cdots & D_3 & D_2 & D_1 \\ D_{2L+2} & D_{2L+1} & D_{2L} & & D_4 & D_3 & D_2 \\ & \vdots & & \ddots & & \vdots & \\ D_{K-2} & D_{K-3} & D_{K-4} & \cdots & D_{K-2L} & D_{K-1-2L} & D_{K-2-2L} \\ D_{K-1} & D_{K-2} & D_{K-3} & & D_{K+1-2L} & D_{K-2L} & D_{K-1-2L} \end{pmatrix} \begin{pmatrix} p_0 \\ p_1 \\ p_2 \\ \vdots \\ p_{2L-1} \\ p_{2L} \end{pmatrix} = 0 \quad (6)$$

$$Dp = 0 \quad (7)$$

At this time, the data count of D needs to satisfy $K \geq 2L+1$. However, the actual measurement data, that is, the data set of $D_k$
$\tilde{D}$
includes noise, and hence p is obtained by solving the following optimization problem.

$$\underset{p}{\operatorname{argmin}} \|\tilde{D}p\|^2 \quad (8)$$

where p is the data set of $p_j$.

In this case, however, since there is an obvious solution of p=0, some constraint condition must be provided to avoid such a solution. Equation (6) can be expanded into $$P(x) = \prod_{l=1}^{L} (x^{-1} - \gamma_l^{-1})(x^{-1} - y_l^{*-1}) \quad (9)$$

$$= \sum_{j=0}^{2L} p_j x^{-j}$$

$$= p_{2L} x^{-2L} + p_{2L-1} x^{-2L-1} + \ldots + p_1 x^{-1} + p_0 x^0$$

Therefore, the following constraint condition is provided:

$$\text{subject to } p_{2L} = p_0 = 1 \quad (10)$$

thus, solving the optimization problem of equation (8). Substituting obtained p into polynomial equation (9) to obtain the solution, results in acquiring $\gamma_l$ and $\gamma_l^*$.

Equation (3) can be rewritten into the following matrix.

$$\begin{pmatrix} 1 & 1 & 1 & 1 & 1 & 1 \\ \gamma_1^1 & \gamma_1^{*1} & \gamma_2^1 & \gamma_2^{*1} & \cdots & \gamma_L^1 & \gamma_L^{*1} \\ \gamma_1^2 & \gamma_1^{*2} & \gamma_2^2 & \gamma_2^{*2} & & \gamma_L^2 & \gamma_L^{*2} \\ \gamma_1^3 & \gamma_1^{*3} & \gamma_2^3 & \gamma_2^{*3} & & \gamma_L^3 & \gamma_L^{*3} \\ & \vdots & & \ddots & & \vdots & \\ \gamma_1^{(K-2)} & \gamma_1^{*(K-2)} & \gamma_2^{(K-2)} & \gamma_2^{*(K-2)} & \cdots & \gamma_L^{(K-2)} & \gamma_L^{*(K-2)} \\ \gamma_1^{(K-1)} & \gamma_1^{*(K-1)} & \gamma_1^{(K-1)} & \gamma_1^{*(K-1)} & & \gamma_L^{(K-1)} & \gamma_L^{*(K-1)} \end{pmatrix} \begin{pmatrix} A_1 \\ A_1^* \\ A_2 \\ A_2^* \\ \vdots \\ A_L \\ A_L^* \end{pmatrix} = \begin{pmatrix} D_0 \\ D_1 \\ D_2 \\ D_3 \\ \vdots \\ D_{K-2} \\ D_{K-1} \end{pmatrix} \quad (11)$$

$$Ga = d \quad (12)$$

However, as in the above case, the actual measurement data
$\tilde{d}$
includes noise, and hence solving the following optimization problem (or Moore-Penrose pseudoinverse matrix) will obtain
$\tilde{a}$, that is, (a set of) $A_l$.

$$\tilde{a} = \underset{a}{\operatorname{argmin}} \|Ga - \tilde{d}\|_{p=2}^2 = (G^T G)^{-1} G^T \tilde{d} \quad (13)$$

where $(G^T G)^{-1} G^T$ is the pseudoinverse matrix of G.

In this manner, the model parameter estimation unit 201 estimates the parameters $A_l$ and $\gamma_l$ in the case of the assumed surface count L.

The model parameter estimation unit 201 further calculates a measurement target reflection coefficient $a_l$ and an optical distance $b_l$ from the estimated parameters $A_l$ and $\gamma_l$.

First, $a_l$ is obtained by calculating the absolute value of the obtained parameter $A_l$.

$$a_l = |A_l| = |a_l e^{i2\pi b_1 k_{min}}| \quad (14)$$

In addition, $b_l$ is obtained from $\gamma_l$ by using equation (15).

$$b_l = \frac{\varphi}{2\pi\Delta k} \quad (15)$$

where $\varphi$ is the argument of $\gamma_l$ of a complex number.

In this manner, the intensity profiles $a_l$ and $b_l$ with the assumed surface count L can be obtained.

When, however, model formula (3) described above is applied to actual measurement, the reflecting surface count L of the measurement target is unknown. Accordingly, the range of the assumed surface counts L is determined, and the model parameters $A_l$ and $\gamma_l$ and the intensity profiles $a_l$ and $b_l$ described above are obtained with respect to each assumed surface count within the range.

The range of the assumed surface counts L may be determined, for example, based on the structural characteristics of a measurement target. More specifically, a concrete structure such as a tunnel wall surface can be assumed to have a reflecting surface count falling within a predetermined range (for example, the range of 1 to 10) in terms of structure. For this reason, the optical interference measuring apparatus 1 may be configured to allow a user to input or set in advance the range of the assumed surface counts L of measurement targets (a minimum value $L_{min}$ of L and a maximum value $L_{max}$ of L) to the apparatus before measurement or computation.

The model parameter estimation unit 201 estimates the model parameters $A_l$ and $\gamma_l$ described above and computes the intensity profiles $a_l$ and $b_l$ with respect to each assumed surface count L within the range of the designated assumed surface counts L (for example, 1, 2, . . . 10).

The intensity profile reconfiguration unit 203 reconfigures the intensity profiles $a_l$ and $b_l$ from equations (15) and (16) obtained by the model parameter estimation unit 201.

The optimal model selection unit 202 calculates the likelihood between the reconfigured interferogram reconfigured by substituting the parameters $A_l$ and $\gamma_l$ corresponding to each reflecting surface count and estimated by the model parameter estimation unit 201 into model formula (3) and a measured interferogram obtained by measurement. The optimal model selection unit 202 selects an optimal model, i.e., the assumed surface count L constituting the optimal model, by applying the assumed surface count L as the degree of freedom to an information amount criterion based on the degree of freedom and the calculated likelihood.

Note that as information amount criteria to be applied, Akaike's information criteria (AIC), finite correction AIC (AICc), or Bayesian information amount criteria (BIC), etc., can be used, although not specifically limited. Known techniques can be used to calculate a likelihood and can be applied to information amount criteria.

The noise removal unit 30 includes a first noise removal unit 301 and a second noise removal unit 302.

Figure 3:
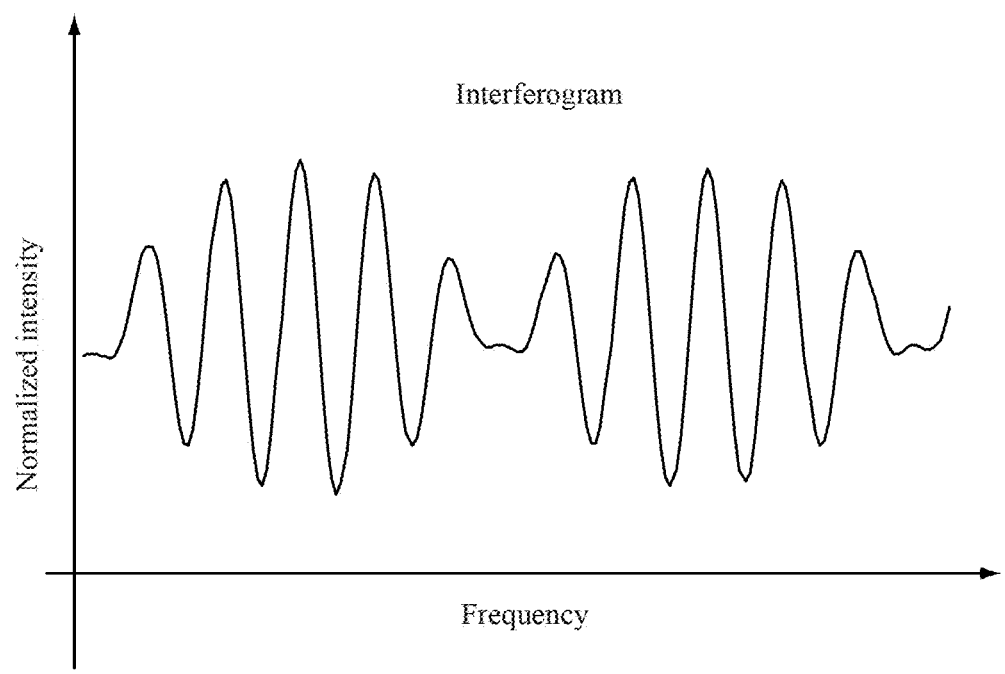
FIG. 3 is a graph illustrating the shape of an interferogram obtained by the optical interference measuring apparatus.
Figure 6:
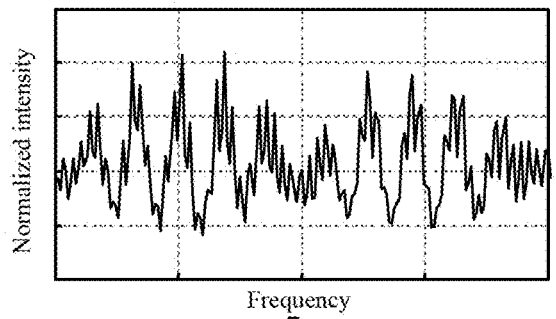
FIG. 6 is a view illustrating graphs for explaining a method of noise removal by a first noise removal unit.
Figure 6:
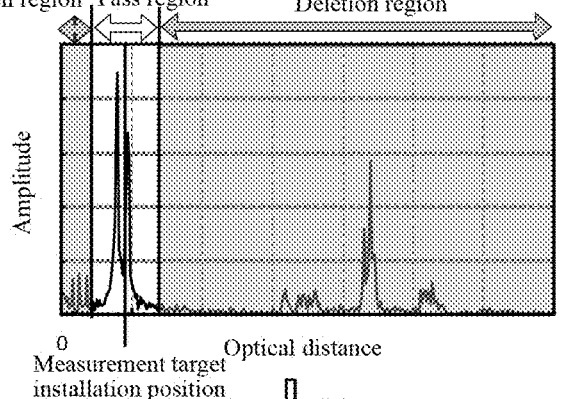
Figure 6:
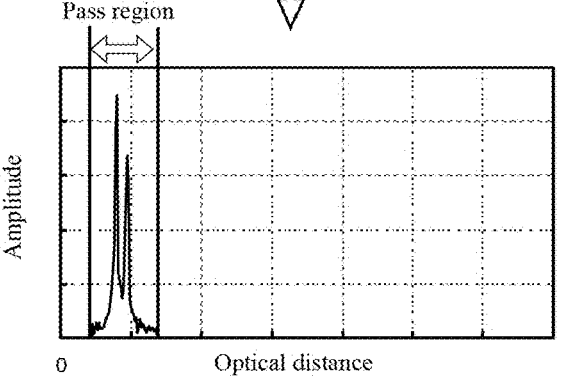
Figure 6:
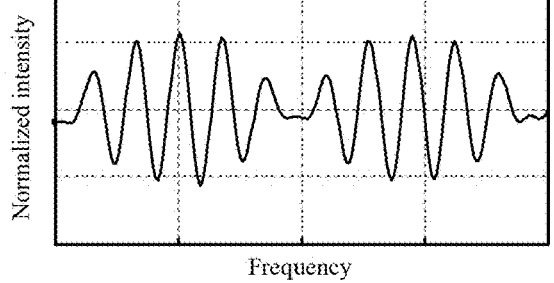

First, an interferogram acquired in measurement by the optical interference measuring apparatus 1 theoretically has the shape illustrated in FIG. 3. However, in actual measurement, the interferogram includes noise as illustrated in FIG. 6(A). Noise includes periodic noise originating from multireflection, etc., in the measurement system and random white Gaussian noise. The first noise removal unit 301 removes periodic noise. The second noise removal unit 302 removes white Gaussian noise.

The first noise removal unit 301 will be described. The FFT analysis unit 10 converts an interferogram into an intensity profile by fast Fourier transform (FFT). Converting an interferogram including noise as illustrated in FIG. 6(A) into an intensity profile by fast Fourier transform will find peaks, when the surface of a measurement target is set as a measurement target installation position, at positions other than in a region near the measurement target installation position, as illustrated in FIG. 6(B). These peaks are periodic noise components.

The first noise removal unit 301 multiples an intensity profile by a window function having, as a pass region, a region set with reference to the measurement target installation position at an optical distance in the depth direction of the measurement target and the remaining regions as deletion regions to perform filtering to delete data in the deletion regions. FIG. 6(C) illustrates an intensity profile obtained by filtering using a rectangular window.

As illustrated in FIG. 6(B), a pass region may be set by designating a predetermined range before and after a measurement target installation position as a reference by setting a surface position of the measurement target as a measurement target installation position. If, for example, the thickness of a measurement target is 10 mm and a surface position (measurement target installation position) of the measurement target is 100 mm, a pass region can be set at 50 mm before and after the measurement target installation position, i.e., in the range of 50 mm to 150 mm. As described above, the first noise removal unit 301 functions as a kind of bandpass filter.

Alternatively, when the middle position of a measurement target is set as a measurement target installation position, the range obtained by adding a predetermined margin to half of the thickness of the measurement target before and after the measurement target installation position as a reference may be set as a pass region and the remaining regions may be set as deletion regions.

In addition, a window function to be used is not limited to a rectangular window illustrated in FIG. 6(C), and it is possible to use various types of window functions used for filtering, such as a Gaussian window, a Hann window, and a Hamming window.

Next, the first noise removal unit 301 converts the intensity profile obtained by deleting the data in the deletion regions into an interferogram, as illustrated in FIG. 6(D), by inverse Fast Fourier transform (IFFT).

In this manner, periodic noise can be effectively deleted from an interferogram.

The second noise removal unit 302 will be described.

Figure 7:
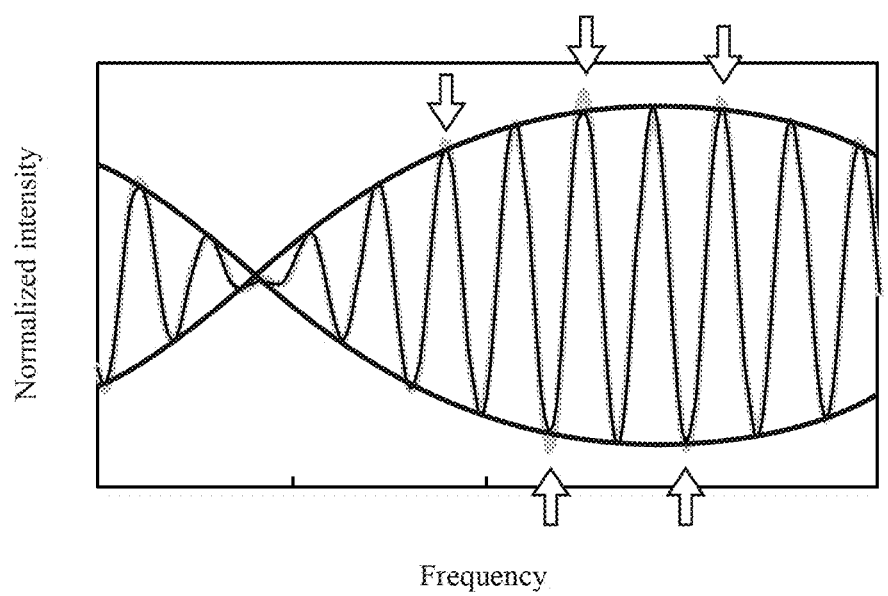
FIG. 7 is a graph for explaining noise removed by noise removal using singular value decomposition.

FIG. 7 is a graph for explaining white Gaussian noise removed by the second noise removal unit 302. Referring to FIG. 7, the black line indicates a theoretical interferogram, and the gray line indicates an interferogram including white Gaussian noise. The theoretical interferogram and the interferogram including noise almost overlap each other. The envelope of the peaks of the theoretical interferogram has a continuous smooth waveform. In contrast to this, the envelope of the interferogram including white Gaussian noise includes portions protruding randomly as indicated by the arrows and hence is not smoothly continuous. The second noise removal unit 302 deletes such noise in the following manner.

(a) The second noise removal unit 302 represents measurement data
$\tilde{D}$
in a matrix from the interferogram like equation (8) and generates a constant diagonal matrix with an element count of (K−2L−1)×(2L+1).

$$\begin{pmatrix} D_{2L} & D_{2L-1} & D_{2L-2} & & D_2 & D_1 & D_0 \\ D_{2L+1} & D_{2L} & D_{2L-1} & \cdots & D_3 & D_2 & D_1 \\ D_{2L+2} & D_{2L+1} & D_{2L} & & D_4 & D_3 & D_2 \\ & \vdots & & \ddots & & \vdots & \\ D_{K-2} & D_{K-3} & D_{K-4} & \cdots & D_{K-2L} & D_{K-1-2L} & D_{K-2-2L} \\ D_{K-1} & D_{K-2} & D_{K-3} & & D_{K+1-2L} & D_{K-2L} & D_{K-1-2L} \end{pmatrix} \quad (16)$$

(b) The second noise removal unit 302 performs singular value decomposition (SVD) of the matrix
$\tilde{D}$
according to equation (17).

$$\tilde{D} = USV^T \quad (17)$$

(where
U is a unitary matrix (complex numbers: UU*=U*U=I) with an element count of (K−2L−1)×(2L+1),
S is a diagonal matrix with an element count of (2L+1)×(2L+1), and
V is a unitary matrix with an element count of (2L+1)×(2L+1).)

(c) Next, the second noise removal unit 302 obtains the singular value diagonal matrix S according to equation (18).

$$S = \begin{pmatrix} \sigma_1 & \cdots & 0 \\ \vdots & \ddots & \vdots \\ 0 & \cdots & \sigma_{2L+1} \end{pmatrix} \quad (18)$$

(where a singular value $\sigma_n$ is the square root of the eigenvalue of $\tilde{D}\tilde{D}^T$.)

(d) Next, the second noise removal unit 302 calculates an evaluation value $V_e$ from the singular value diagonal matrix S. For example, the evaluation value $V_e$ may be set like equation (19) by regarding a value $\sigma_{2L+1}$ of the (2L+1)th element of the diagonal matrix S as a noise component and also regarding a value $\sigma_{2L}$ of the 2Lth element as a signal component.

$$V_e = \frac{\sigma_{2L+1}}{\sigma_{2L}} \quad (19)$$

(e) Next, the second noise removal unit 302 constructs a diagonal matrix S' according to equation (20) by deleting at least a minimum singular value $\sigma_{2L+1}$ as a noise element from the obtained singular value diagonal matrix S.

$$S' = \begin{pmatrix} \sigma_1 & \cdots & 0 \\ \vdots & \ddots & \vdots \\ 0 & \cdots & 0 \end{pmatrix} \quad (20)$$

Note that the second noise removal unit 302 need not always delete only a minimum singular value but may delete all singular values of components deemed unnecessary.

(f) In addition, an interferogram
$\tilde{D}'$
is reconfigured from the calculated diagonal matrix S' according to equation (21).

$$US'V^T = \tilde{D}' \quad (21)$$

where $\tilde{D}'$ least squares approximation with respect to $\tilde{D}$. That is, the square error of each element of $\tilde{D}-\tilde{D}'$ is the minimum.
$\tilde{D}'$
to which noise is removed is not always a diagonal matrix. Accordingly, a diagonal constant matrix $\tilde{D}'_{ave}$ is obtained by using average values along the diagonals of $\tilde{D}'$.

(g) The operations in (b) to (f) are repeated until the evaluation value $V_e$ becomes smaller than a predetermined threshold Th by using the reconfigured diagonal constant matrix
$\tilde{D}'_{ave}$.
The interferogram
$\tilde{D}'_{ave}$
with the evaluation value $V_e$ being smaller than the predetermined threshold Th is reconfigured as an interferogram after the noise removal.

Only the removal of a first noise component or the removal of a second noise component by singular value decomposition may be separately performed as follows. When, for example, the influence of the first noise component is deemed to be larger and the influence of the second noise component is deemed to be smaller, only the removal of the first noise component is performed. When the influence of the second noise component is deemed to be larger and the influence of the first noise component is deemed to be smaller, only the removal of the second noise component is performed.

When both the removal of the first noise component and the removal of the second noise component are performed, removal operations are preferably executed in the following manner, although the execution order is not specifically limited. When the influence of the first noise component is deemed to be larger and the influence of the second noise component is deemed to be smaller, the removal of the first noise component is performed first. When the influence of the second noise component is deemed to be larger and the influence of the first noise component is deemed to be smaller, the removal of the second noise component is performed first.

3. Optical Interference Measuring Method

An optical interference measuring method using the optical interference measuring apparatus 1 will be described below with reference to FIGS. 8 to 13. Assume that in each step described below, obtained parameters, interferograms, intensity profiles, etc., are stored in the storage unit as needed and are read out in subsequent steps. Therefore, an explanation of this operation will be omitted.

Figure 8:
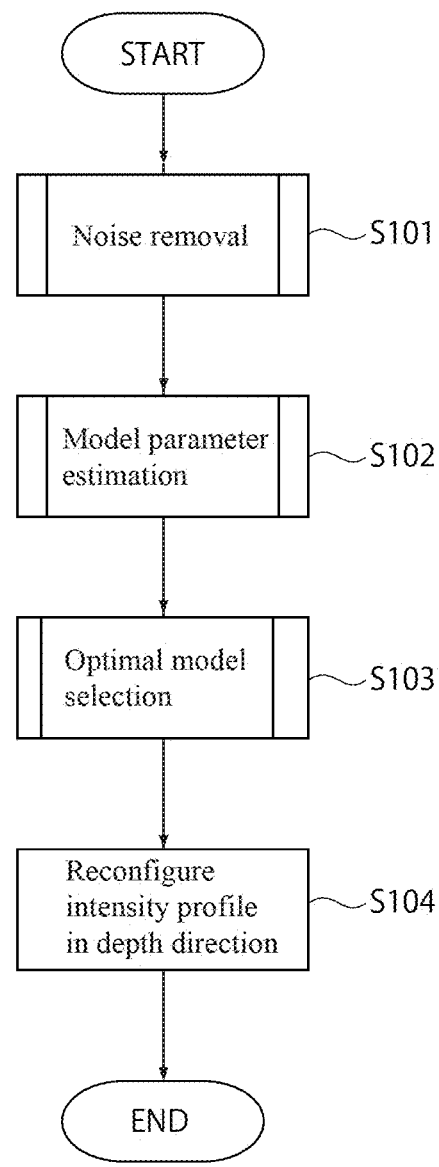
FIG. 8 is a flowchart of processing by an optical interference measuring method using the optical interference measuring apparatus.

FIG. 8 is a schematic flowchart for processing by the optical interference measuring method. First, when the processing starts, the noise removal unit 30 removes noise from a measurement interferogram in step S101. Next, in step S102, the model parameter estimation unit 201 estimates parameters for a model by using the interferogram from which noise has been removed. Next, in step S103, the optimal model selection unit 202 selects an optimal model. Next, in step S104, the intensity profile reconfiguration unit 203 reconfigures an intensity profile in the depth direction. Processing in each step will be described in detail below.

Figure 9:
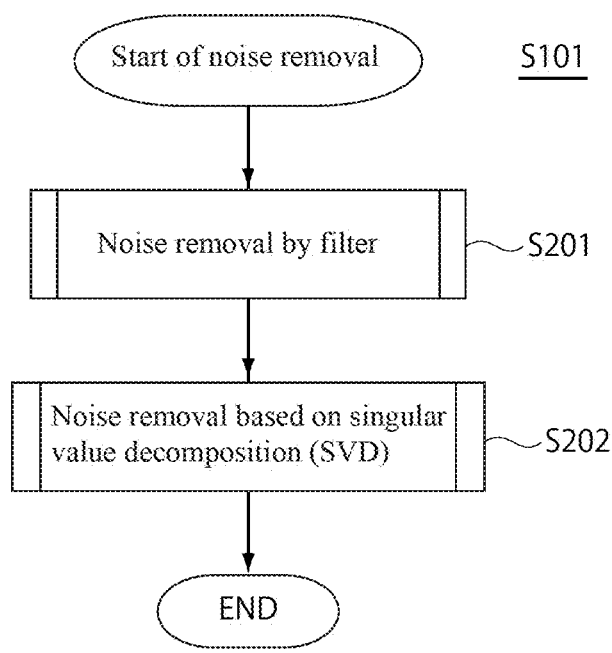
FIG. 9 is a flowchart of noise removal processing in the optical interference measuring method.

FIG. 9 is a flowchart for detailed processing associated with the noise removal in step S101.

When noise removal starts, the first noise removal unit 301 removes noise by using a filter in step S201. In step S202, the second noise removal unit 302 removes noise by singular value decomposition (SVD). Subsequently, the process shifts to step S102.

Figure 10:
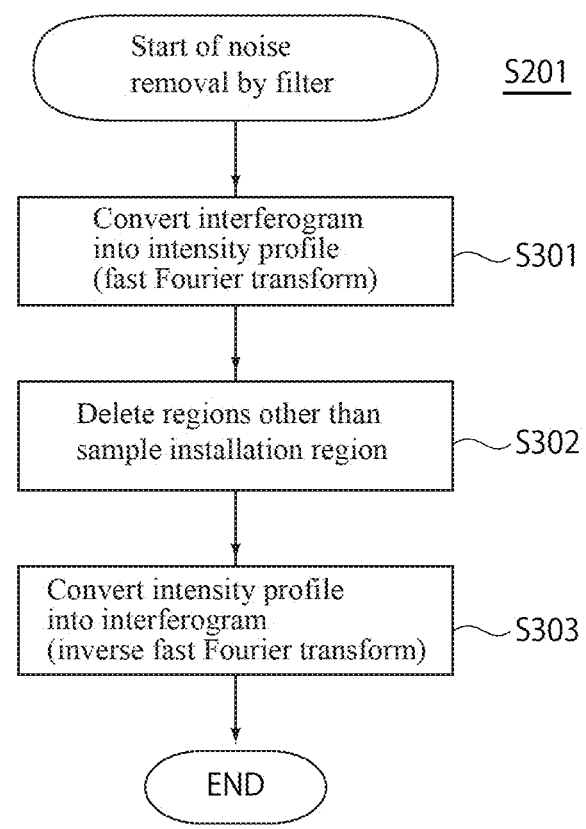
FIG. 10 is a flowchart of noise removal processing of the noise removal which uses a filter.

FIG. 10 is a detailed flowchart for noise removal by the filter in step S201.

When noise removal using the filter starts, the FFT analysis unit 10 converts a measurement interferogram into an intensity profile by fast Fourier transform in step S301.

Next, in step S302, the first noise removal unit 301 sets, as a pass region, a region of the intensity profile with reference to a measurement target installation position, and also sets the remaining regions as deletion regions to perform filtering to delete data in the deletion regions.

Next, in step S303, the first noise removal unit 301 converts the intensity profile after the filtering, which is obtained in step S302, into an interferogram by inverse fast Fourier transform and terminates the processing. Subsequently, the process shifts to step S202.

Figure 11:
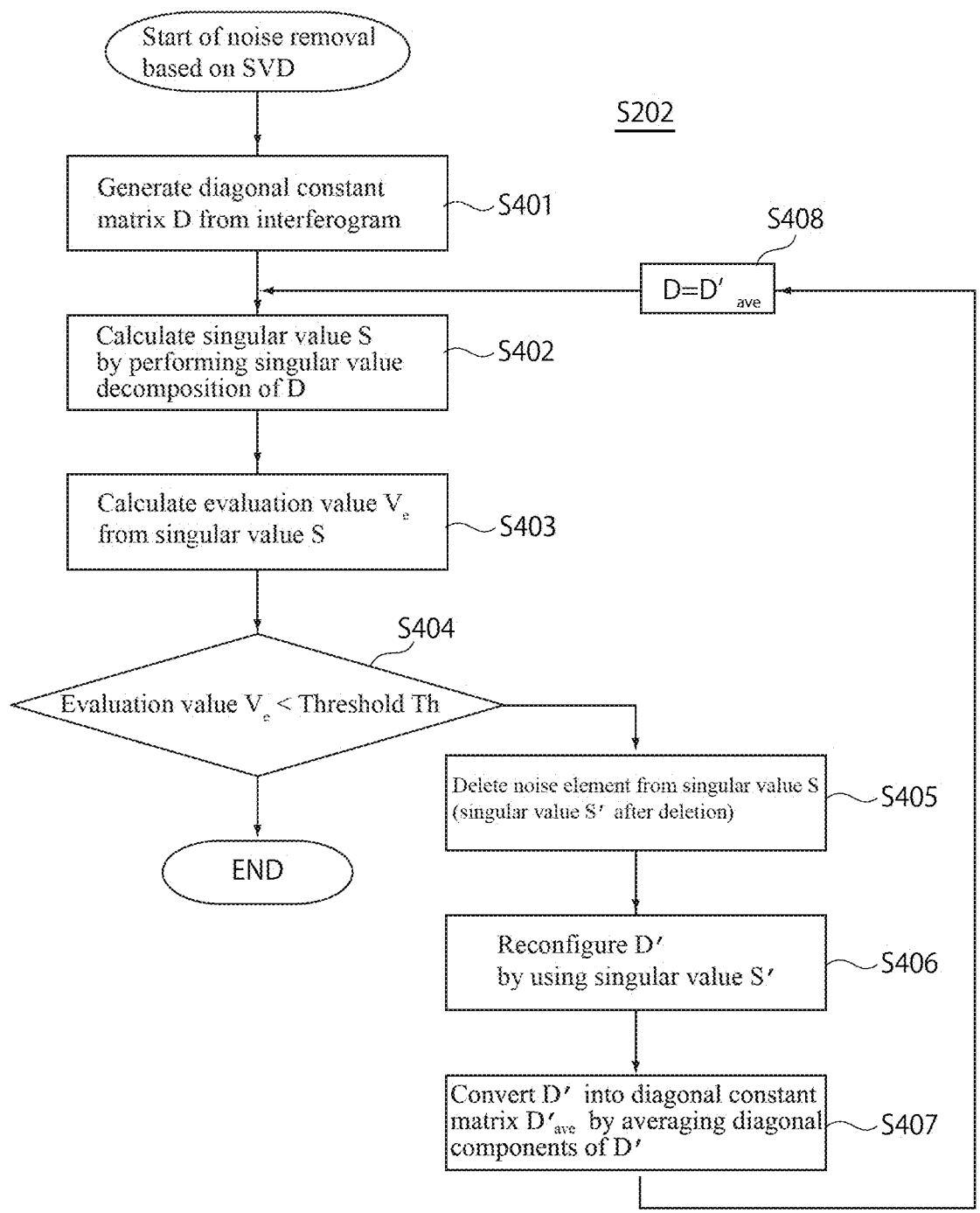
FIG. 11 is a flowchart of noise removal processing of the noise removal which uses singular value decomposition.

FIG. 11 is a flowchart for detailed processing for noise removal by singular value decomposition in step S202.

When noise removal by singular value decomposition starts, the second noise removal unit 302 creates a diagonal constant matrix D from the interferogram in step S401.

Next, in step S402, the second noise removal unit 302 calculates a singular value diagonal matrix S (equation (18)) by performing singular value decomposition of the matrix D.

Next, in step S403, the second noise removal unit 302 calculates an evaluation value V (equation (19)) from the singular value S.

Next, in step S404, the second noise removal unit 302 compares the evaluation value $V_e$ with the predetermined threshold Th to determine whether the evaluation value $V_e$ is smaller than the threshold Th.

If the evaluation value $V_e$ is equal to or more than the threshold Th (No), the second noise removal unit 302 calculates a singular value S' by deleting a noise element from the singular value matrix S in step S405 (equation (20)).

Next, in step S406, the interferogram matrix
$\tilde{D}'$
is reconfigured by using the singular value decomposition S'.

Next, in step S407, the diagonal components of the matrix
$\tilde{D}'$
are averaged to obtain the diagonal constant matrix
$\tilde{D}'_{ave}$
so as to establish $$\tilde{D} = \tilde{D}'_{ave}$$

in step S408. The process then returns to step S402 to repeat steps S402 to S404.

On the other hand, if it is determined in step S404 that the evaluation value Ye is smaller than the threshold Th (YES), the interferogram D is set as an interferogram after the noise removal, and the processing is terminated. The process shifts to step S102.

Alternatively, instead of providing a threshold and repeating the deletion of a noise component until an evaluation value satisfies the threshold, a repetition count may be set in advance and noise component removal may be repeated until the set count is satisfied.

Figure 12:
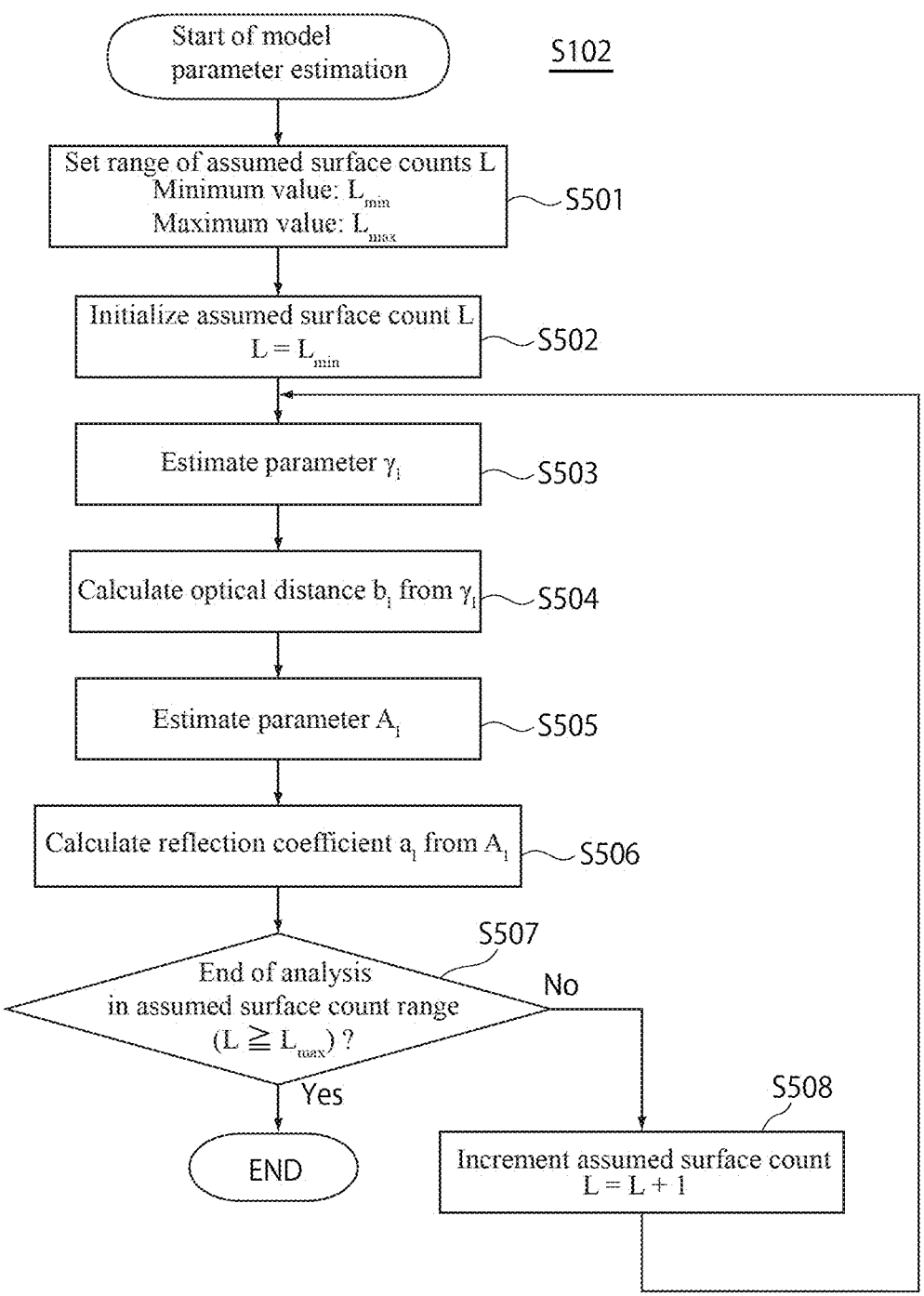
FIG. 12 is a flowchart of model parameter estimation processing in the optical interference measuring method.

FIG. 12 is a detailed flowchart associated with the estimation of parameters for a model in step S102. When model parameter setting starts, the model parameter estimation unit 201 sets the range of the assumed surface counts L (that is, the minimum value $L_{min}$ and the maximum value $L_{max}$) based on user input, etc., in step S501.

Next, in step S502, the model parameter estimation unit 201 initializes the assumed surface count L into $L=L_{min}$.

Next, in step S503, the model parameter estimation unit 201 calculates the parameter $\gamma_l$ for model formula (3) by calculating equations (4) to (12) under the condition of the assumed surface count $L_{min}$.

Next, in step S504, the model parameter estimation unit 201 calculates the optical distance $b_l$ from the parameter $\gamma_l$ obtained in step S503 by using equation (16).

Next, in step S505, the model parameter estimation unit 201 calculates the parameter $A_l$ from the interferogram and the parameter $\gamma_l$ by calculating equations (12) to (14).

Next, in step S506, the model parameter estimation unit 201 calculates the reflection coefficient $a_l$ from the parameter $A_l$ by using equation (15).

Next, in step S507, the model parameter estimation unit 201 determines whether the assumed surface count L is equal to or more than $L_{max}$, that is, analysis with each assumed surface count L within the range of the assumed surface counts L set in step S501 is thoroughly completed.

If L is equal to or more than $L_{max}$ (Yes), the processing is terminated, and the process shifts to step S104. If L is smaller than $L_{max}$ (No), the model parameter estimation unit 201 increments the assumed surface count L to set L=L+1 in step S508. The process then returns to step S501 to repeat steps S501 to S507 until the assumed surface count L becomes equal to or more than $L_{max}$.

Figure 13:
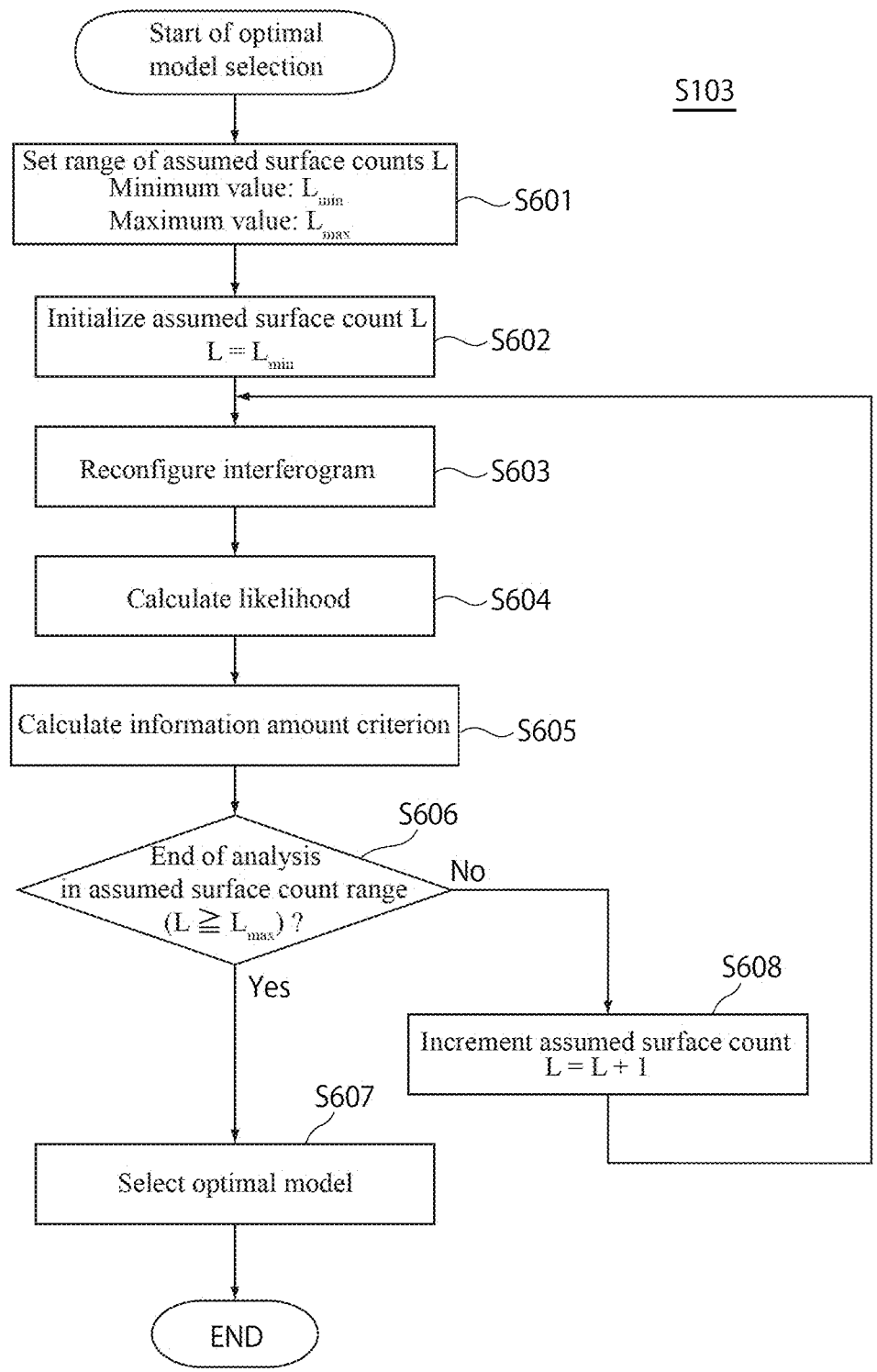
FIG. 13 is a flowchart of optimal model selection processing in the same method.

FIG. 13 is a detailed flowchart associated with the selection of an optimal model in step S103.

When the processing starts, the optimal model selection unit 202 sets the range of the assumed surface counts L (that is, the minimum value $L_{min}$ and the maximum value $L_{max}$) set in step S501.

Next, in step S602, the optimal model selection unit 202 initializes the assumed surface count L into $L=L_{min}$.

Next, in step S603, the optimal model selection unit 202 reconfigures an interferogram by using the parameters $A_l$ and $\gamma_l$ estimated by the model parameter estimation unit 201 with assumed surface count $L=L_{min}$.

Next, in step S604, the optimal model selection unit 202 calculates the likelihood between the measured interferogram from which noise has been removed in step S101 and the reconfigured interferogram in step S603.

Next, in step S605, the optimal model selection unit 202 calculates an information amount criterion with respect to the assumed surface count L by setting the assumed surface count L as the degree of freedom and using the likelihood obtained in step S604.

Next, in step S606, the optimal model selection unit 202 determines whether the assumed surface count L is equal to or more than $L_{max}$, that is, analysis with all the assumed surface counts L within the range of the assumed surface counts L set in step S501 is completed.

If L is equal to or more than $L_{max}$ (Yes), the optimal model selection unit 202 compares information amount criterion values corresponding to all the assumed surface counts L with each other to select a model with the assumed surface count L corresponding to the minimum information amount criterion value as an optimal model in step S607. The processing is then terminated.

On the other hand, if it is determined in step S606 that L is smaller than $L_{max}$ (No), the optimal model selection unit 202 increments the assumed surface count to set L=L+1 in step S608. The process then returns to step S603 to repeat steps S603 to S606 until the assumed surface count L becomes equal to or more than $L_{max}$.

In this manner, in step S104, the assumed surface count corresponding to the selected optimal model is provided for the reconfiguration of an intensity profile by the intensity profile reconfiguration unit 203.

The intensity profile reconfigured in this manner can be used for the analysis of the intensity profile in the depth direction. In addition, interferograms measured by scanning along the two axes, i.e., the X-axis and the Y-axis, can be used for the configuration of a three-dimensional image.

4. Examples

4-1. Example 1: Simulation Results Based on Estimation of Model Parameters

Figure 14:
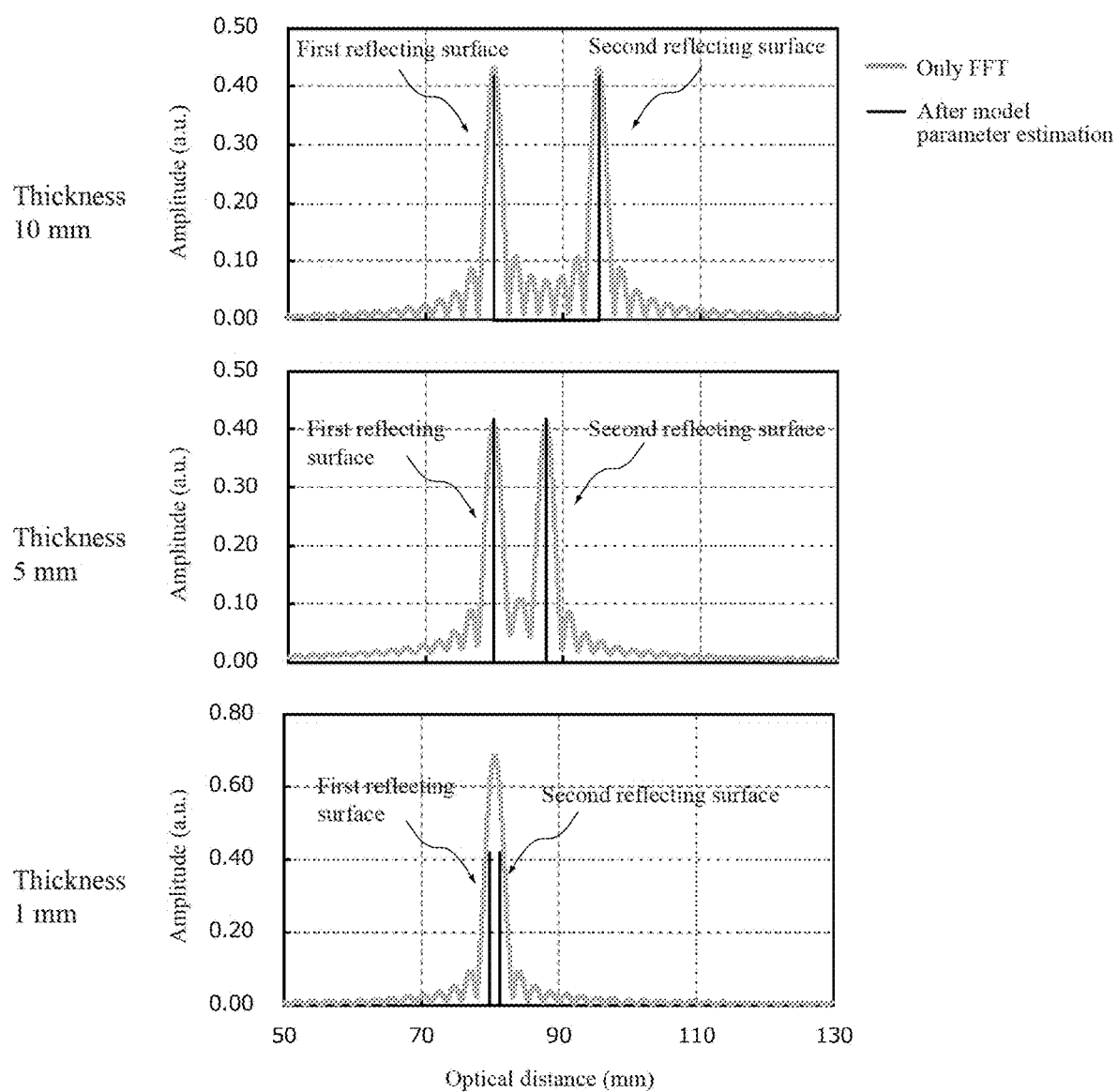
FIG. 14 is a view illustrating graphs for simulation results of intensity profile reconfiguration using the model parameters estimated by the same method.

FIG. 14 illustrates the results of simulations of intensity profiles by the optical interference measuring apparatus 1 when the light source 21 is frequency-modulated with 600 GHz to 665 GHz. A measurement target was set such that the optical distance of the surface (first reflecting surface) was 80 mm. The upper, intermediate, and lower graphs each illustrate a result obtained when a sample had the structure illustrated in Table 1 and a constant refractive index of 1.53.

TABLE 1

Simulation Conditions in Example 1

Sample Structure

| FIG. 14 | Reflecting Surface Count | Thickness (mm) |
|---|---|---|
| Upper | 2 | 10 |
| Intermediate | 2 | 5 |
| Lower | 2 | 1 |

Referring to FIG. 14, in this embodiment, the black lines indicate intensity profiles $a_l$ and $b_l$ reconfigured based on the model parameters $\gamma_l$ and $A_l$ estimated from equation (3) upon setting assumed surface count L=2. In comparison with the black lines, the gray lines each indicate the results of converting the same interferogram into an intensity profile only by fast Fourier transform.

Each gray line appears as having a broad peak, whereas each black line appears as having a sharp peak. According to the intensity profiles based on fast Fourier transform, the peak on the first surface and the peak on the second surface are separated from each other in the case of a thickness of 10 mm, overlap each other in the case of a thickness of 5 mm, and are not separated at all in the case of a thickness of 1 mm. In contrast to this, according to the intensity profiles reconfigured based on the estimation of model parameters in this embodiment, the peaks on the first and second surfaces are separated from each other at any thickness.

This indicates that an intensity profile in the depth direction which is reconfigured based on estimated model parameters obtained by model parameter estimation by using model formula (3) allows measurement with higher resolution than that based on a technique using general Fourier transform.

4-2 Example 2: Actual Measurement Experiment (1) Noise Removal by Filter

Figure 15:
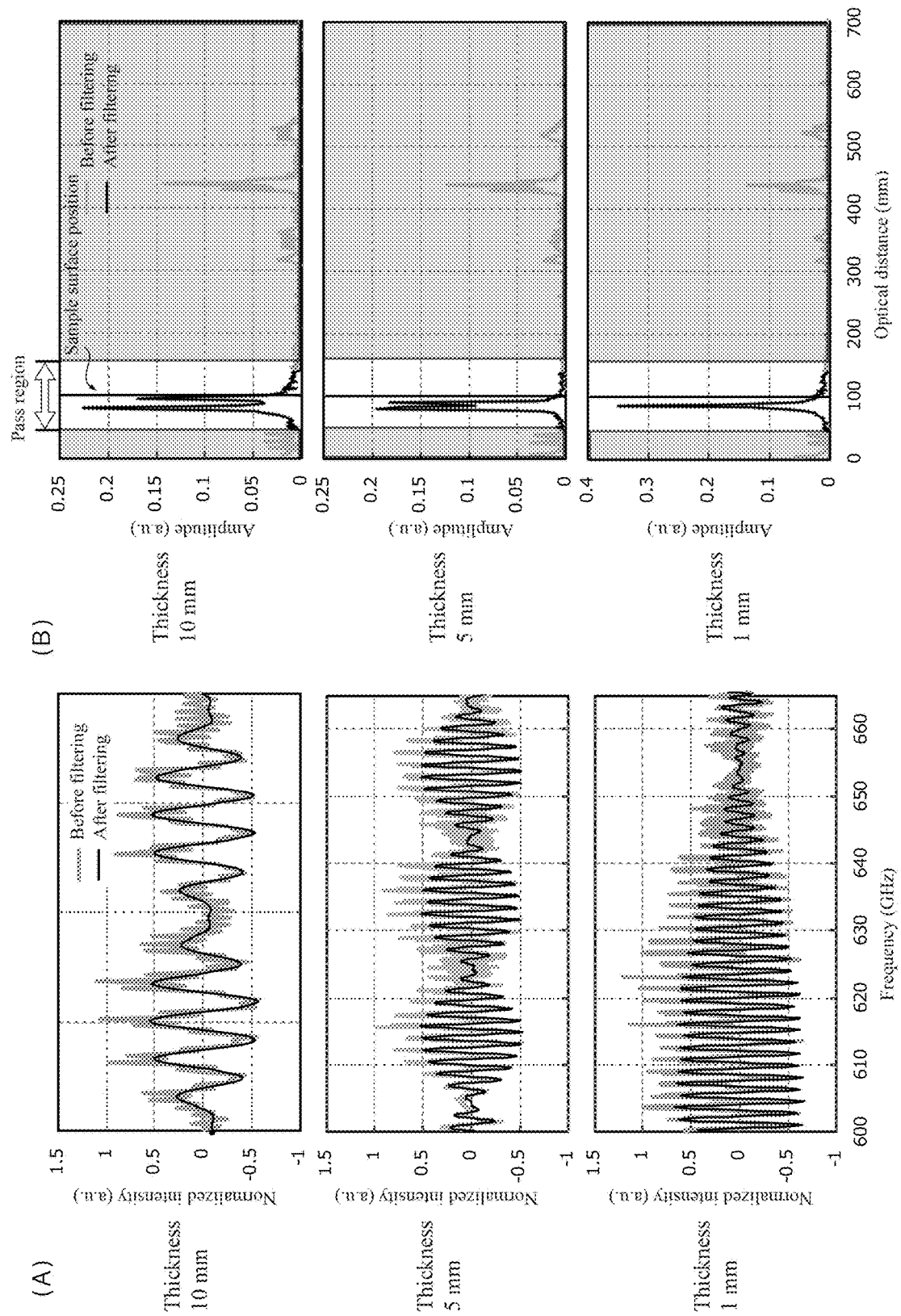
FIG. 15 is a view illustrating graphs for noise removal results using a filter in the same method.

Next, an actual measurement experiment using the optical interference measuring apparatus 1 was performed. Plastic flat plates having the structures indicated by Table 2 and a constant refractive index were used as measurement targets (samples). Measurement was performed such that the measurement target was placed, with the optical distance of the surface (first reflecting surface) being 80 mm, and a light source was frequency-modulated in the range of 600 GHz to 665 GHz. FIG. 15 illustrates results of noise removal by filter in step S201 using actually measured interferograms. The upper, intermediate, and lower graphs respectively indicate the results of experiments conducted under the conditions indicated in Table 2. Pass regions were set at −34 mm to +57 mm with reference to the position (80 mm) of a sample surface (that is, the optical distances were 46 mm to 137 mm).

TABLE 2

Actual Measurement Experiment Conditions

Sample Structure

Figure 16:
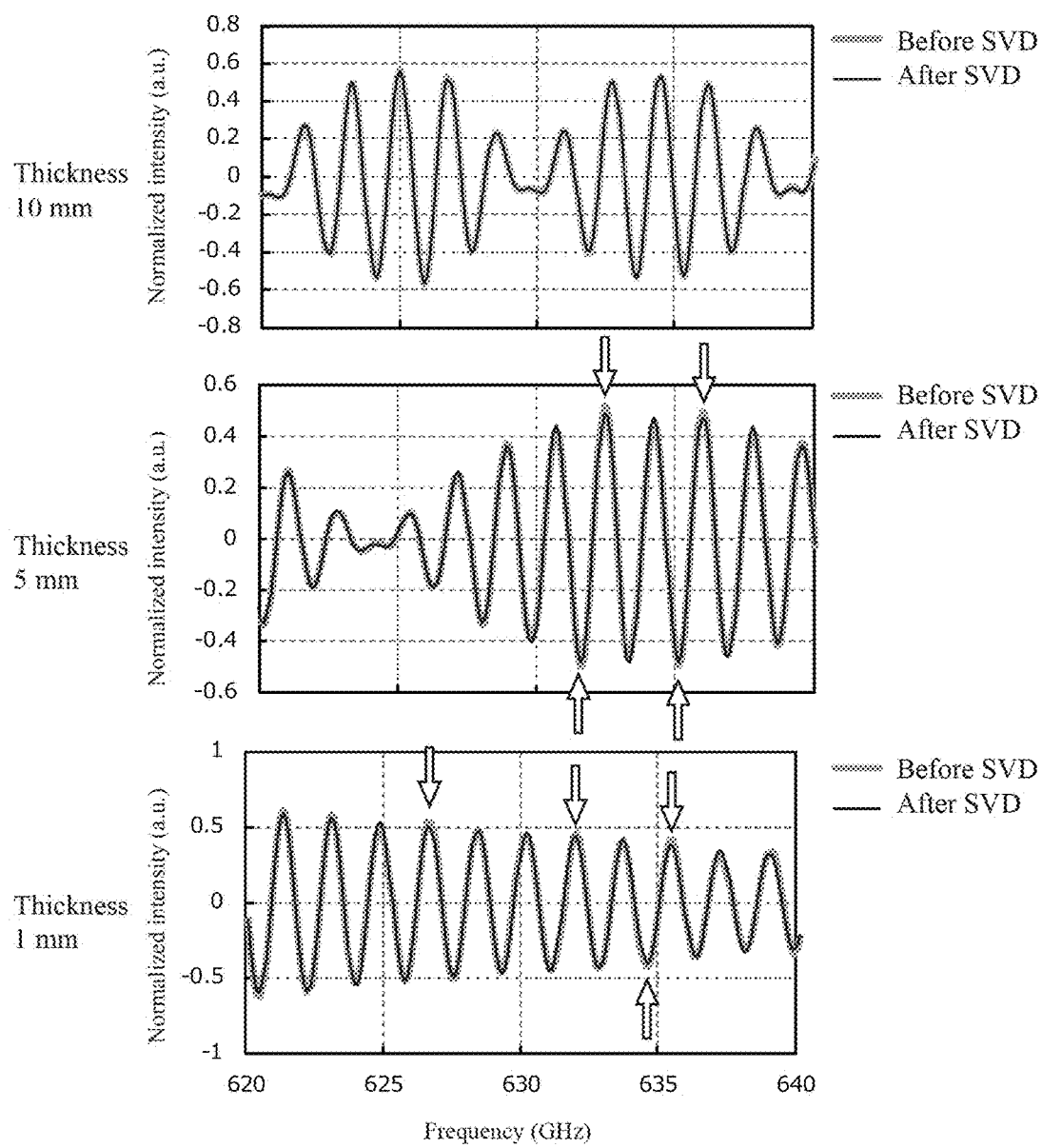
FIG. 16 is a view illustrating graphs for noise removal results by singular value decomposition using an interferogram after noise removal using the filter.
Figure 17:
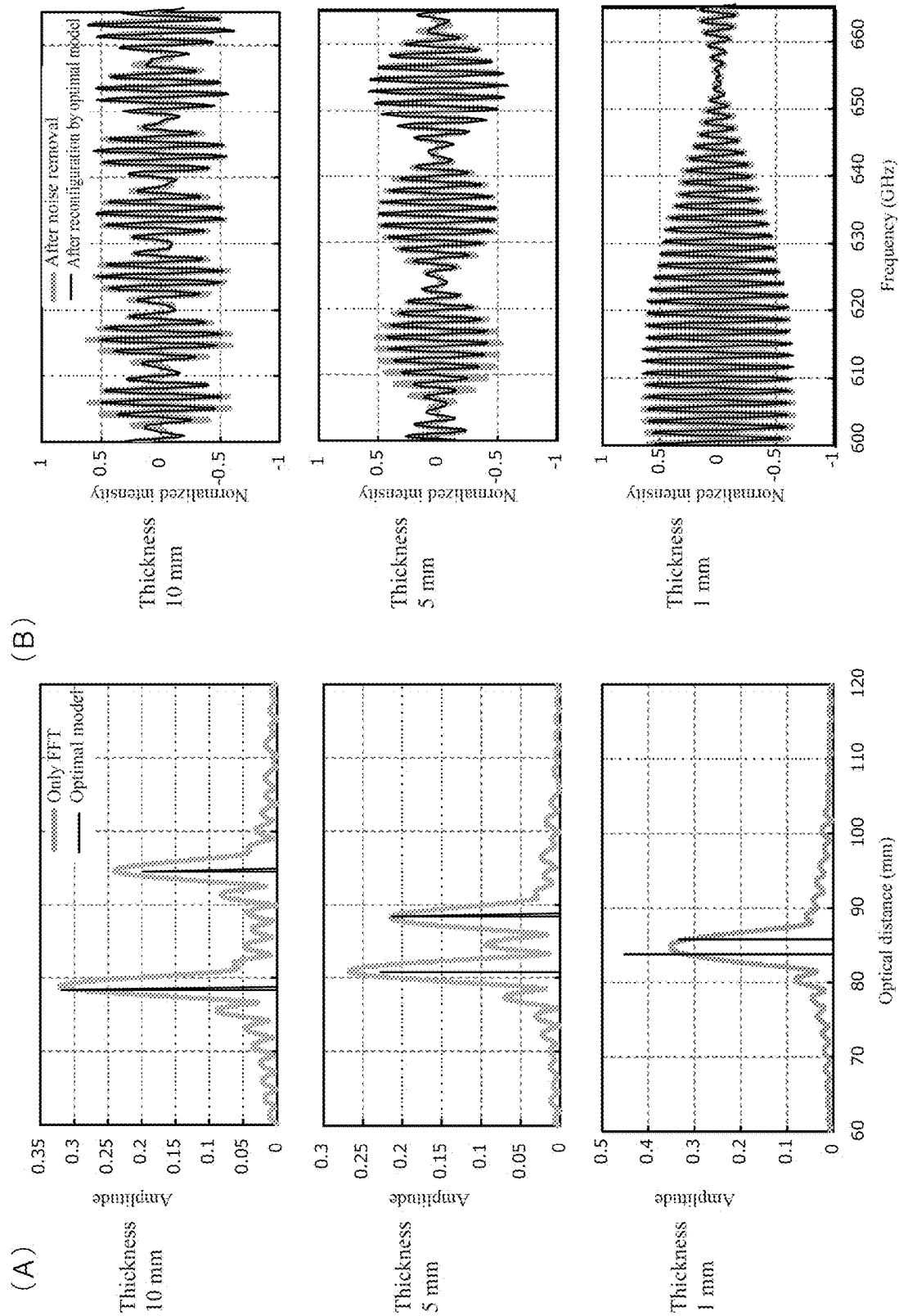
FIG. 17 is a view illustrating graphs for optimal model selection results using an interferogram after noise removal by the singular value decomposition.

| FIGS. 15 to 17 | Reflecting Surface Count | Thickness (mm) | Material |
|---|---|---|---|
| Upper | 2 | 10 | polyethylene |
| Intermediate | 2 | 5 | polyethylene |
| Lower | 2 | 1 | polystyrene |

Referring to FIG. 15(A), the gray line indicates an interferogram before filtering. The gray line in FIG. 15(B) indicates the intensity profile obtained by fast Fourier transform of the interferogram before filtering. In addition, the black line in FIG. 15(B) indicates an intensity profile after the filtering. The black line in FIG. 15(A) indicates the interferogram obtained by inverse fast Fourier transform of the intensity profile after the filtering.

As illustrated in FIG. 15(B), noise not originating from the samples is accurately deleted by filtering upon setting pass regions with reference to the positions of the sample surfaces, that is, the sample installation positions, for samples of any thickness. In addition, periodic noise is deleted from the interferograms obtained by inverse fast Fourier transform of the intensity profiles after filtering.

As described above, periodic noise can be removed from an interferogram in the following manner. The interferogram is Fourier transformed to configure an intensity profile. A pass region is set in the intensity profile with reference to the sample installation position to delete data in regions other than the pass region, thus filtering the intensity profile. Inverse Fourier transform is applied to the intensity profile after the filtering.

(2) Noise Removal by Singular Value Decomposition (SVD)

FIG. 16 indicates the results obtained by noise removal based on singular value decomposition using an interferogram after noise removal by the above filter.

Referring to FIG. 16, each gray line indicates an interferogram before noise removal by singular value decomposition, and each black line indicates an interferogram after the noise removal by singular value decomposition. At any thickness, portions protruding from the envelopes before the noise removal are removed to obtain smoothly continuous envelopes, as is obviously indicated by the portions of the interferograms after the noise removal which are indicated by the arrows, in particular.

As described above, random white Gaussian noise can be removed from an interferogram by generating a diagonal constant matrix from the interferogram, calculating a singular value diagonal matrix by performing singular value decomposition of the diagonal constant matrix, and deleting noise components from the singular value diagonal matrix.

(3) Reconfiguration of Intensity Profile by Optimal Model

Next, model parameters were estimated at each assumed surface count by using an interferogram after noise removal by singular value decomposition in the above actual measurement experiment and setting the range of the assumed surface counts L to 1 to 10. In addition, an interferogram was reconfigured at each assumed surface count by using the model parameters. The likelihood between the interferogram after the noise removal and the reconfigured interferogram was calculated, and an AIC value at each assumed surface count was obtained by setting the assumed surface count as the degree of freedom, thereby selecting a model exhibiting the minimum AIC value as an optimal model. The assumed surface counts L corresponding to the minimum AIC values were 7, 7, and 6 with thicknesses of 10 mm, 5 mm, and 1 mm, respectively.

FIG. 17(A) illustrates intensity profiles. Each gray line indicates the intensity profile obtained by Fourier transform of an interferogram after noise removal by the singular value decomposition described above. Each black line indicates the intensity profile reconfigured based on the selected optimal model.

FIG. 17(B) illustrates interferograms. Each gray line indicates the interferogram after noise removal by the singular value decomposition described above. Each black line indicates the interferogram reconfigured based on an optimal model.

As is obvious from FIG. 17(A), at any thickness, the intensity profile reconfigured based on an optimal model can be observed with higher resolution than the intensity profile generated by Fourier transform. At a thickness of 1 mm, peaks on the first and second reflecting surfaces can be separated from each other.

Next, as is obvious from FIG. 17(B), at any thickness, the interferogram reconfigured from an optimal model can almost reproduce the interferogram after the noise removal as input data.

As described above, an interferogram is reconfigured by using a model formula to which the parameters estimated with respect to each assumed surface count are applied, the likelihood between the reconfigured interferogram and the original interferogram is calculated, and an optimal model formula is selected based on the information amount criterion obtained by setting an assumed surface count as the degree of freedom, thereby reconfiguring an intensity profile by using the optimal model formula. As a result, an intensity profile in the depth direction can be measured with higher resolution than that based on a technique using general Fourier transform.

Examples described above each indicate the results of simulations and actual measurement experiments for samples, each with the reflecting surface count L of 2. However, similar results were obtained in the case in which the reflecting surface count L is 1 and 3 or more.

As described above, the optical interference measuring method according to this embodiment includes a noise removal method of removing noise and a super-resolution analysis method of reconfiguring an intensity profile based on an optimal model upon estimating model parameters and selecting the optimal model. In addition, the noise removal method includes a noise removal method using a filter and a noise removal method based on singular value decomposition. As is obvious from the above experiment results, these methods each can independently produce an effect and only the noise removal operation may be performed for the purpose of noise removal. Alternatively, only the super-resolution analysis method may be performed for the purpose of improving the resolution. Executing together the noise removal method and the super-resolution analysis method will noticeably improve the resolution, thus providing an advantageous effect.

5. Modification

Figure 18:
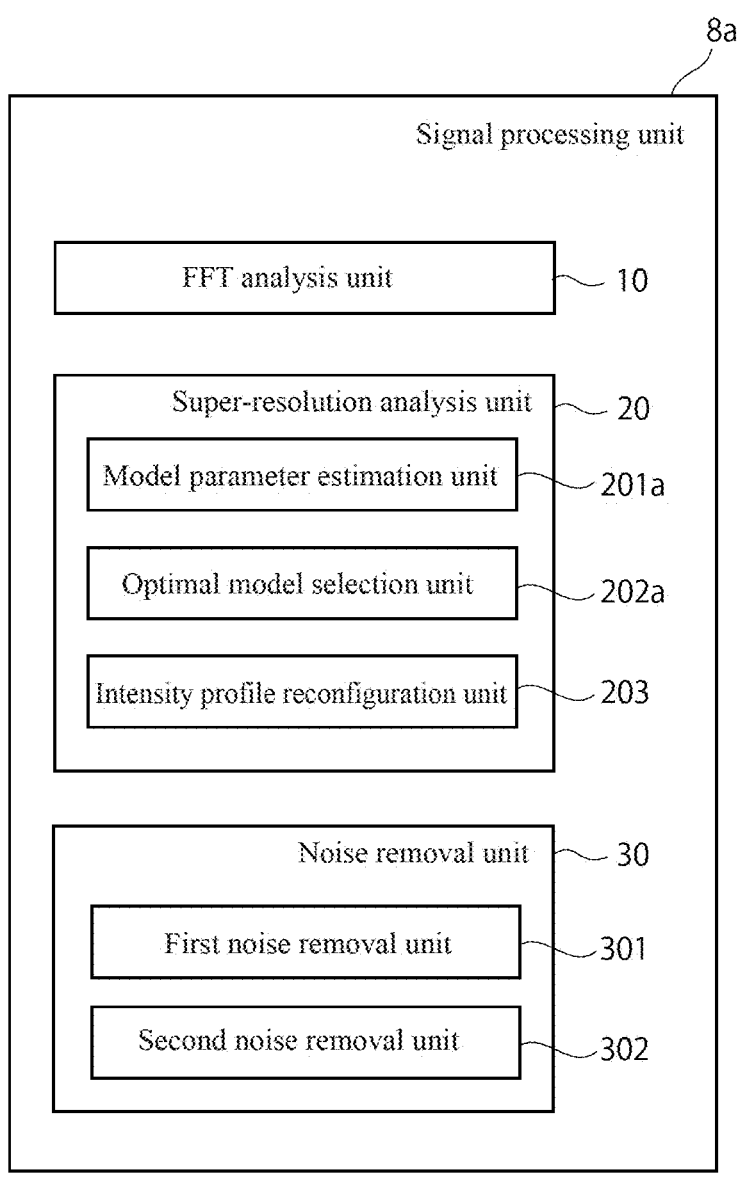
FIG. 18 is a functional configuration view of a signal processing unit according to one modification of the optical interference measuring apparatus according to the embodiment.

One modification of this embodiment may be configured such that steps S501 and S601 are automatically set. FIG. 18 is a functional configuration view of a signal processing unit 8a of an optical interference measuring apparatus 1a according to this modification. The optical interference measuring apparatus 1a has a configuration almost similar to that of the optical interference measuring apparatus 1 but differs from the optical interference measuring apparatus 1 in that the signal processing unit 8a includes a model parameter estimation unit 201a and an optimal model selection unit 202a instead of the model parameter estimation unit 201 and the optimal model selection unit 202, respectively.

Figure 19:
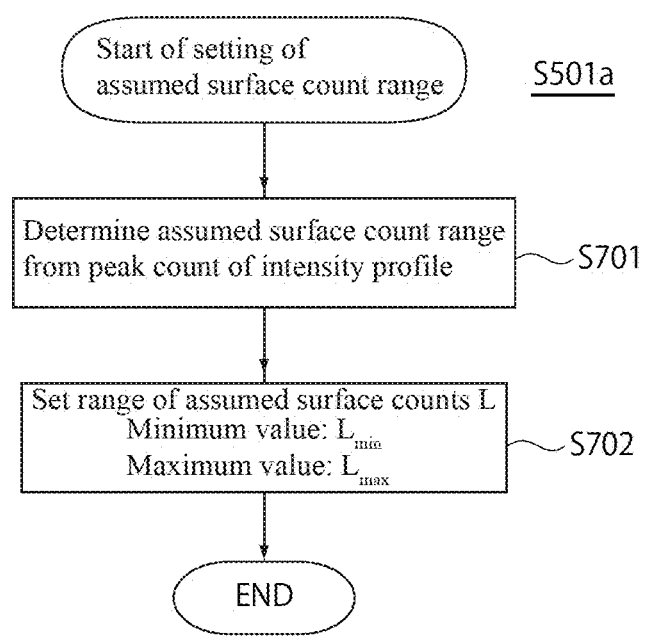
FIG. 19 is a flowchart for setting an assumed surface count range by the signal processing unit.

The model parameter estimation unit 201a performs the processing illustrated in FIG. 19 instead of step S501 in estimating model parameters. That is, when the setting of the range of the assumed surface counts L starts, the model parameter estimation unit 201a refers to the intensity profile obtained by Fourier transform of an interferogram by the FFT analysis unit 10 (for example, in step S301, etc.) to determine an assumed surface count based on a peak count in step S701. More specifically, when two peaks are confirmed as indicated by the gray line in FIG. 14, the range of peak counts of 2±5 (note, however, that the assumed surface count L is a natural number) is set, and the range of the assumed surface counts is determined as 1 to 7.

Next, in step S702, the range of the assumed surface counts L (that is, the minimum value $L_{min}$ and the maximum value $L_{max}$) is set based on the above determination, and the processing is terminated. The process then shifts to step S502.

The optimal model selection unit 202a also has a configuration similar to that described above.

This configuration makes it possible to automatically set a proper range of the assumed surface counts L, thereby facilitating a measuring operation.

Note that the present invention is not limited to the above embodiment and may include various changes. The above embodiment has been described in detail for a better understanding of the present invention. However, the present invention is not limited to an apparatus including all the configurations described above. For example, the above description concerns the optical interference measuring apparatus which is an SS-OCT. However, the present invention is not limited to this and can be applied to an optical interference measuring apparatus such as an SD-OCT configured to obtain an intensity profile in the depth direction by Fourier transform. In addition, with regard to some components of each Example, other components may be added, deleted, or replaced.

REFERENCE SIGNS LIST 1, 1a: Optical interference measuring apparatus
8, 8a: Signal processing unit
20: Super-resolution analysis unit
201, 201a: Model parameter estimation unit
202, 202a: Optimal model selection unit
203: Intensity profile reconfiguration unit

The invention claimed is:

1. An optical interference measuring apparatus comprising:
a measuring unit including a light source for emitting an electromagnetic beam, a beam splitter for splitting a the electromagnetic beam into measurement light and reference light, a reference surface for reflecting the reference light, and a detector for acquiring an interferogram of an interference wave by detecting an interference signal between reflected light of the reference light with which the reference surface is irradiated and reflected light of the measurement light with which a measurement target is irradiated; and
an electrical circuit configured to configure an intensity profile in a depth direction by performing Fourier transform of the interferogram,
the electrical circuit configured to estimate, based on a model formula of an interferogram when it is assumed that a measurement target is a layered structure having at least one reflecting surface, a parameter for the model formula for each assumed surface count in a predetermined assumed surface count range,
reconfigure an interferogram by using the model formula to which a parameter estimated for each of the assumed surface count is applied, calculate a likelihood between the reconfigured interferogram and an original interferogram, and select an optimal model formula based on an information amount criterion obtained by setting the assumed reflecting surface count as the degree of freedom, and
reconfigure an intensity profile in the depth direction based on the optimal model formula.

2. The optical interference measuring apparatus according to claim 1, wherein the electric circuit is configured to estimate, based on a model formula of an interferogram when it is assumed that a measurement target is a layered structure having at least one reflecting surface count, with a refractive index in each layer being constant, a parameter for the model formula.

3. The optical interference measuring apparatus according to claim 1, characterized in that the assumed surface count range is determined based on a structure characteristic of a measurement target.

4. The optical interference measuring apparatus according to claim 1, characterized in that the assumed surface count range is determined based on a peak count of an intensity profile in the depth direction which is configured by the original interferogram.

5. An optical interference measuring method comprising:
configuring an intensity profile in a depth direction by irradiating a measurement target and a reference surface with electromagnetic waves and performing Fourier transform of an interferogram of an interference wave obtained by causing a reflected wave from a reflecting surface of the measurement target to interfere with a reflected wave from the reference surface;
estimating, based on a model formula of an interferogram when it is assumed that a measurement target is a layered structure having at least one reflecting surface count, a parameter for the model formula for each assumed surface count in a predetermined assumed surface count range;
selecting an optimal model formula by a statistical technique from the model formula to which a parameter estimated for each of the assumed surface count is applied; and
reconfiguring an intensity profile based on the optimal model formula,
wherein the step of selecting the optimal model formula includes reconfiguring an interferogram by using the model formula to which a parameter estimated for each of the assumed surface count is applied, calculating a likelihood between the reconfigured interferogram and an original interferogram, and selecting the optimal model formula based on an information amount criterion obtained by setting the assumed reflecting surface count as the degree of freedom.

* * * * *